(12) United States Patent
Yamaguchi

(10) Patent No.: US 9,465,640 B2
(45) Date of Patent: Oct. 11, 2016

(54) INFORMATION PROCESSING APPARATUS AND METHOD OF CONTROLLING INFORMATION PROCESSING APPARATUS

(71) Applicant: FUJITSU LIMITED, Kawasaki-shi, Kanagawa (JP)

(72) Inventor: Hirobumi Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/483,534

(22) Filed: Sep. 11, 2014

(65) Prior Publication Data

US 2015/0128137 A1 May 7, 2015

(30) Foreign Application Priority Data

Nov. 1, 2013 (JP) .................................. 2013-228182

(51) Int. Cl.
*G06F 9/455* (2006.01)

(52) U.S. Cl.
CPC . *G06F 9/45558* (2013.01); *G06F 2009/45579* (2013.01)

(58) Field of Classification Search
CPC .................. G06F 9/45558; G06F 2009/45579
USPC ........................................................... 718/1
See application file for complete search history.

(56) References Cited

U.S. PATENT DOCUMENTS

| | | | |
|---|---|---|---|
| 2006/0150006 A1 | 7/2006 | Mizutani | |
| 2009/0083735 A1* | 3/2009 | Kimura | G06F 9/52 718/1 |
| 2009/0265708 A1 | 10/2009 | Nakajima | |
| 2012/0117334 A1* | 5/2012 | Sheaffer | G06F 12/084 711/145 |
| 2015/0081043 A1* | 3/2015 | Kim | G05B 15/02 700/19 |

FOREIGN PATENT DOCUMENTS

| | | |
|---|---|---|
| JP | 2006-178636 | 7/2006 |
| JP | 2008-234141 | 10/2008 |
| JP | 2009-80695 | 4/2009 |
| JP | 2009-193504 | 8/2009 |
| JP | 2009-259108 | 11/2009 |
| JP | 2012-3313 | 1/2012 |

* cited by examiner

*Primary Examiner* — Anna Deng
(74) *Attorney, Agent, or Firm* — Fujitsu Patent Center

(57) ABSTRACT

An information processing apparatus includes: a VM including a driver that is configured to perform data input/output using an input/output device; a hypervisor configured to manage the VM and perform a synchronization process between the information processing apparatus and another information processing apparatus which form a pair; a monitoring unit configured to monitor an access made between a memory and the input/output device; a notification unit configured to notify the hypervisor of detection of a reading access in a case where the reading access relating to data output from the memory to the input/output device is detected by the monitoring unit; and a suppression unit configured to suppress the data output in a case where the hypervisor is in the middle of execution of the synchronization process when the hypervisor receives the notification from the notification unit. Accordingly, the input/output access performance of the VM is improved.

16 Claims, 20 Drawing Sheets

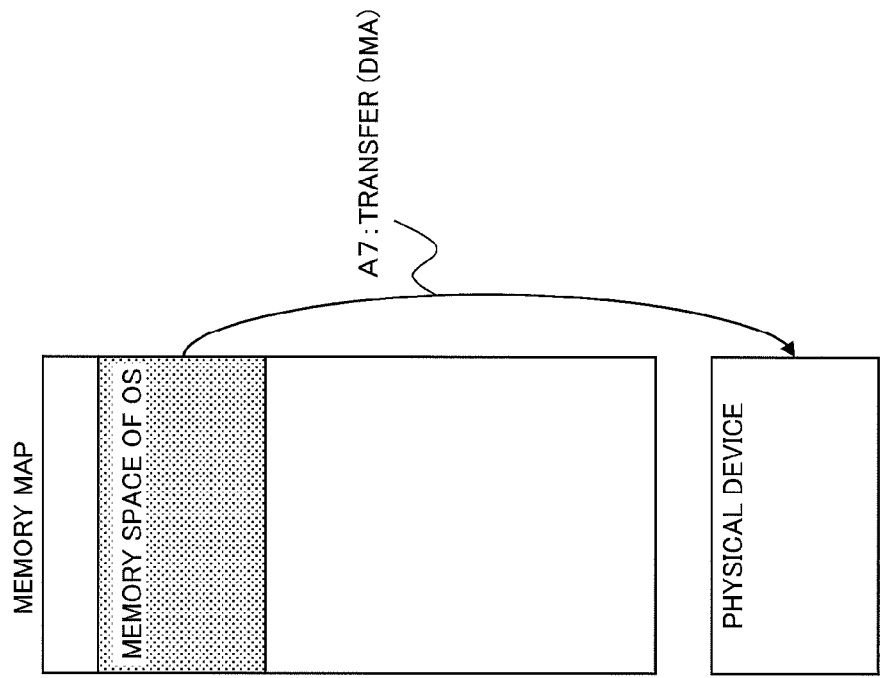
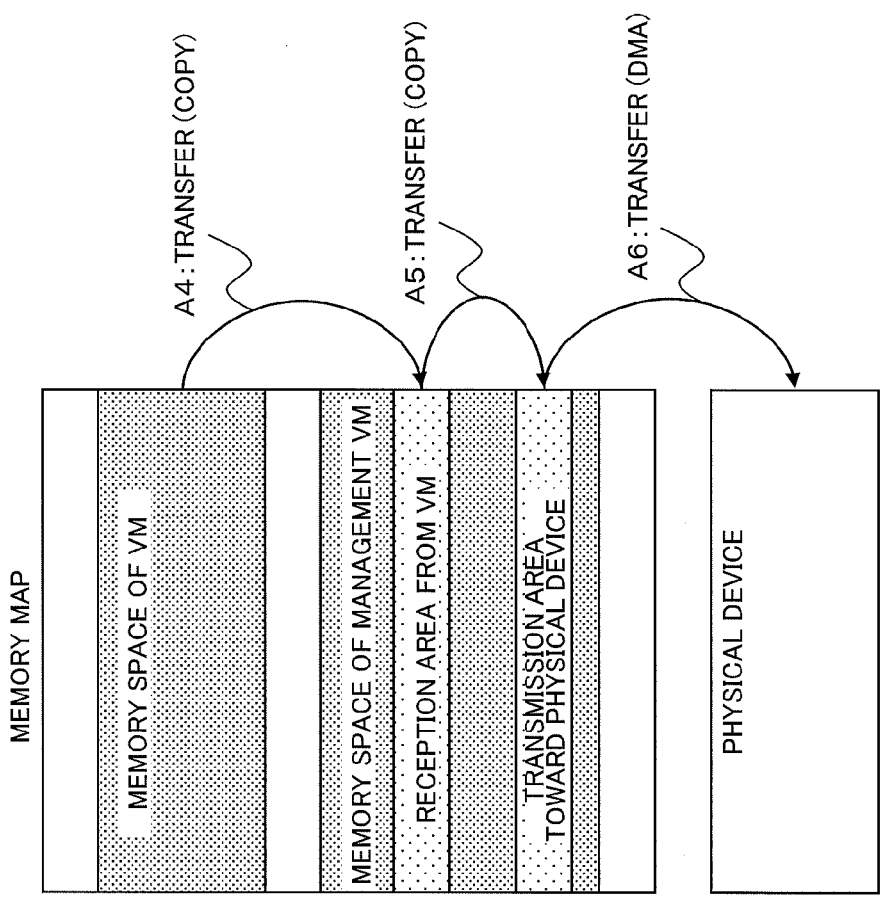

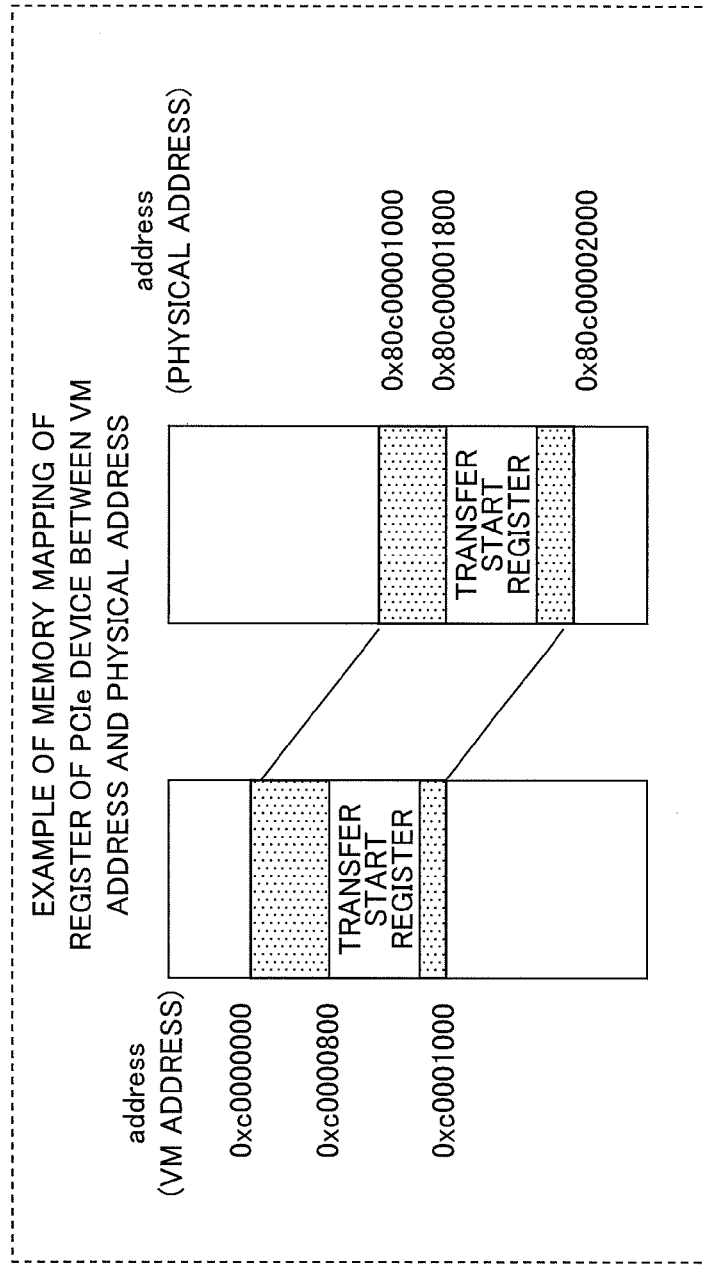

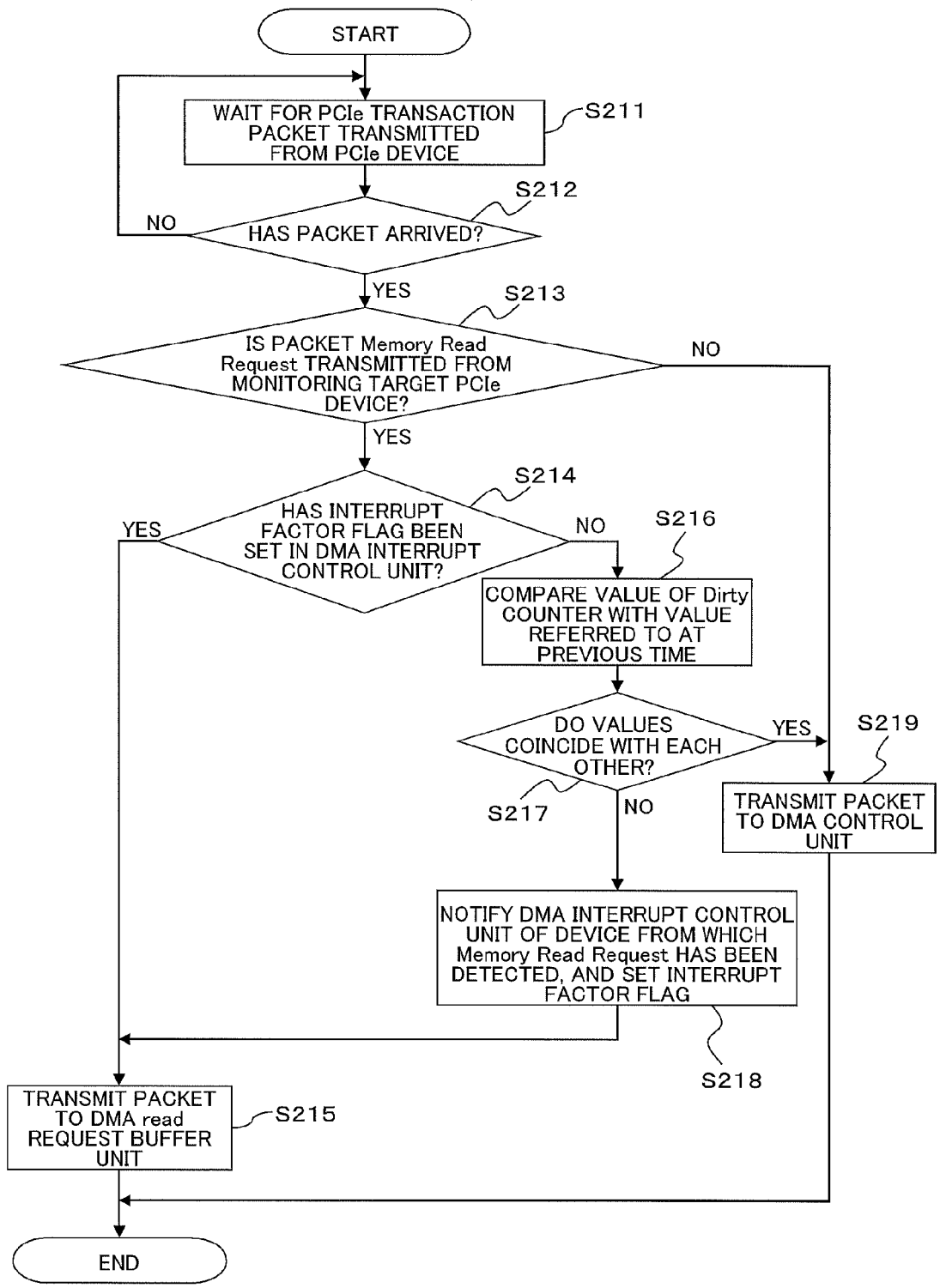

FIG. 15A
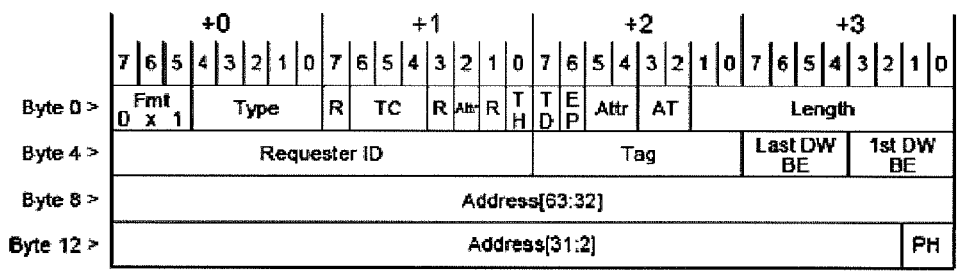
PCI-Express transaction request header format example
FIG. 15B
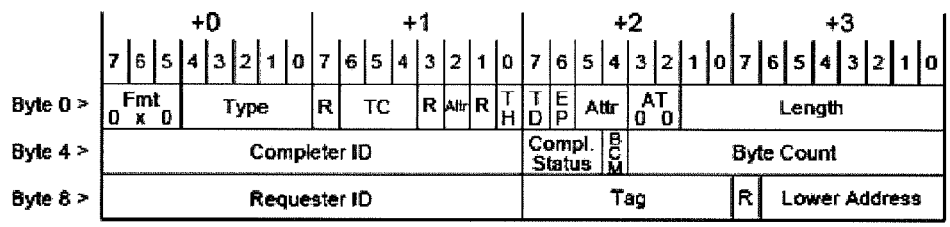
PCI-Express transaction completion header format example
FIG. 15C
16b
| Requester ID | VMID |
|---|---|
| Requester ID OF PCIe DEVICE THAT IS MONITORING TARGET | IDENTIFIER OF VM USING DEVICE |
| Requester ID OF PCIe DEVICE THAT IS MONITORING TARGET | IDENTIFIER OF VM USING DEVICE |
| ... | ... |
|  |  |
MONITORING TARGET PCIe DEVICE MANAGEMENT TABLE

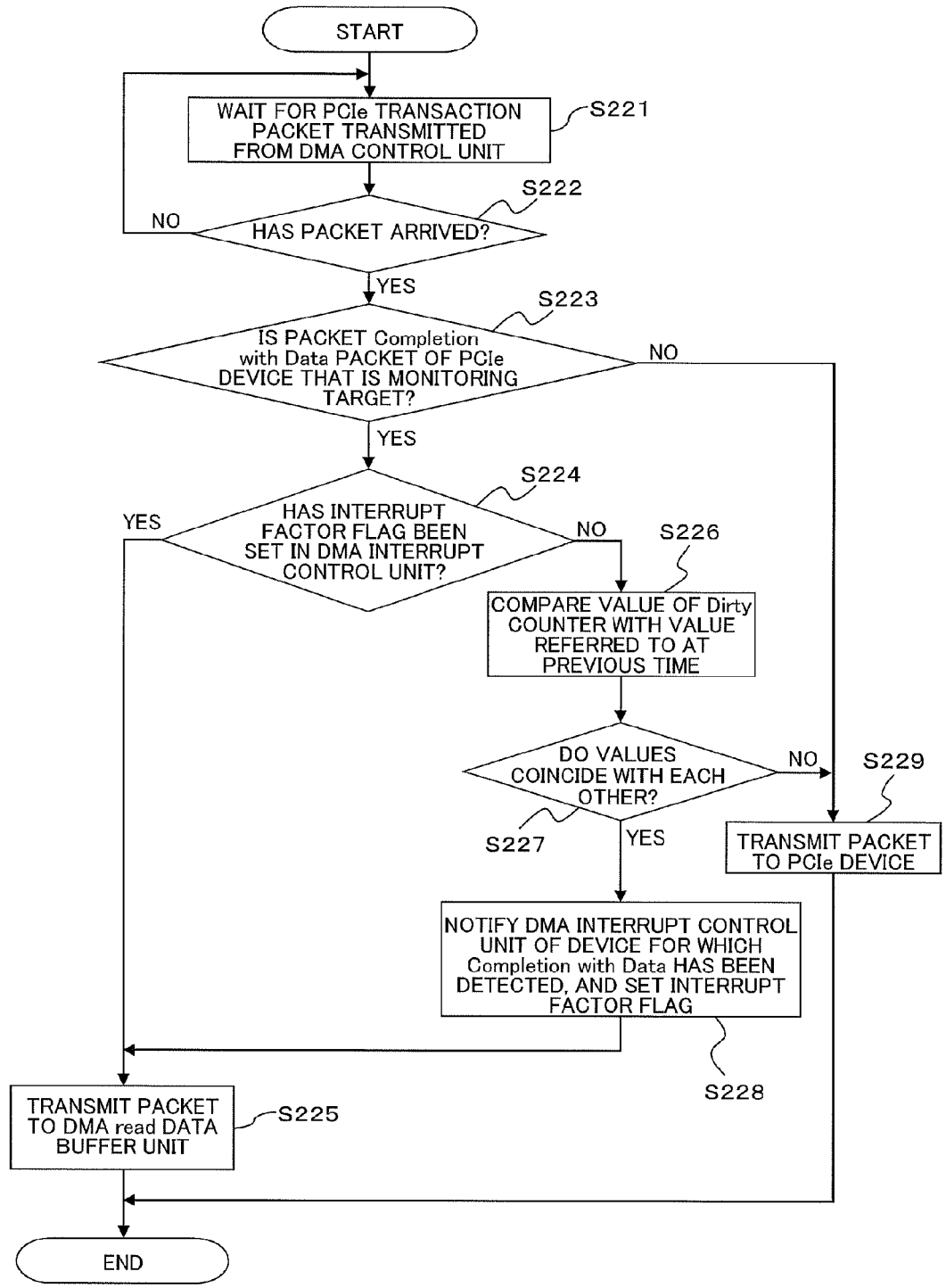

ered to an input/output controller. The data transmitted from the IO device is received by an FT control unit and is transmitted to each CPU subsystem (calculation unit) at timing that is set in consideration of a deviation between clock signals. In order to realize the FT server as described above, for the following reasons (b1) to (b3), the two CPU subsystems (calculation units) and the IO device need to be physically separated.

(b1) As the FT server, in order to avoid a single breakdown point, the two CPU subsystems (calculation units) need to be physically separated from each other.

(b2) An FT control unit and an IO comparison unit need to be arranged between the CPU subsystem and the IO device.

(b3) The two CPU subsystems need to share one IO device.

INFORMATION PROCESSING APPARATUS AND METHOD OF CONTROLLING INFORMATION PROCESSING APPARATUS

CROSS-REFERENCE TO RELATED APPLICATION

This application is based upon and claims the benefit of priority of the prior Japanese Application No. 2013-228182 filed on Nov. 1, 2013 in Japan, the entire contents of which are hereby incorporated by reference.

FIELD

The embodiments discussed herein are related to an information processing apparatus and a method of controlling an information processing apparatus.

BACKGROUND

A fault-tolerant (FT) server has two sets of hardware, which have the same configuration, interconnected using Ethernet (registered trademark) or the like. Accordingly, in the FT server, even in a case where one set of the hardware is broken down, the operation can be continued by the other set thereof without allowing a user to be aware of the occurrence of the breakdown. As techniques for realizing the FT server described above, there are techniques not using a hypervisor (JP 2006-178636 A, JP 2008-234141 A, and JP 2009-193504 A) and techniques using a hypervisor (JP 2009-80695 A and JP 2012-3313 A).

As an FT server not using a hypervisor, there is a server in which two sets of systems are synchronized with each other by causing two sets of central processing units (CPUs) to perform the same operation by supplying the same clock signal thereto (JP 2008-234141 A). At the time of a direct memory access (DMA), data from a CPU subsystem to a physical device (for example, an input/output controller) is transmitted from each CPU subsystem to an input/output router, and the input/output router transmits the data to a comparator that has a buffer of a first-in first-out (FIFO) type. In the comparator, it is checked that data pieces received from the two CPU subsystems coincide with each other, and one data piece is transmitted to the input/output controller. In order to realize the FT server described above, for the following reasons (a1) to (a3), the two CPU subsystems and each input/output controller need to be physically separated from each other.

(a1) As the FT server, in order to avoid a single breakdown point, the two CPU subsystems need to be physically separated from each other.

(a2) An input/output router and a comparator need to be arranged between the CPU subsystem and the input/output controller.

(a3) The two CPU subsystems need to share one input/output controller.

In addition, as an FT server not using a hypervisor, there is a server that synchronizes two sets of systems by causing two sets of CPUs (calculation units) to perform the same operation using a clock management unit by supplying mutually-different clock signals thereto (JP 2009-193504 A). At the time of a DMA, data from the CPU subsystem (calculation unit) to a physical device (input/output (IO) device) is transmitted from each CPU subsystem to an IO comparison unit. In the IO comparison unit, it is checked that data pieces received from the two CPU subsystems coincide with each other, one piece of the data is transmitted Recently, implementation of system on chip (SoC) in which an input/output controller (a physical device or an input/output device) is built inside the CPU subsystem has progresses. However, in the FT server not using the hypervisor as described above, two CPU subsystems (calculation units) and each input/output controller or an IO device need to be physically separated. Accordingly, as described above, the FT server not using a hypervisor cannot be applied to a configuration in which an input/output device is included inside the CPU subsystem, in other words, a configuration employing a CPU configured as the SoC.

On the other hand, in the FT server using a hypervisor, a virtual machine (VM) built on the hypervisor is set as a fault-tolerant target. In the FT server using the hypervisor, the output of data to the outside needs to be checked, so that the process is succeeded from one set (primary) of hardware to the other set (secondary) of the hardware at the time of the occurrence of a breakdown. Accordingly, the I/O device is emulated as a virtual device, and all the data outputs for the outside are output through the hypervisor. In other words, the I/O device is virtualized by the hypervisor, and the operating system (OS) on the VM is controlled to necessarily access the virtual I/O device of the hypervisor. In this way, the hypervisor can check the data output for the outside.

As described above, the FT server not using a hypervisor cannot be applied to the configuration employing a CPU configured as the SoC.

In contrast to this, the FT server using a hypervisor can be applied to the configuration using the CPU configured as the SoC. However, the output of data to the outside needs to be checked. Accordingly, the I/O device is emulated as a virtual device, and all the data outputs for the outside are output through the hypervisor. As a result, due to the overhead of the virtualization, the input/output access performance of the VM, particularly, the output performance (performance of data output for the outside) from the I/O device is degraded.

SUMMARY

According to an embodiment, there is provided an information processing apparatus including: a virtual machine including a driver that is configured to perform data input/output using an input/output device; a hypervisor configured to manage the virtual machine and perform a synchronization process between the information processing apparatus and another information processing apparatus which form a pair; a monitoring unit configured to monitor an access made between a memory and the input/output device; a notification unit configured to notify the hypervisor of detection of a reading access in a case where the reading access relating to data output from the memory to the input/output device is detected by the monitoring unit; and a suppression unit configured to suppress the data output in a case where the hypervisor is in the middle of execution of the synchronization process when the hypervisor receives the notification from the notification unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram that illustrates a memory map of a case where a hypervisor is used, and FIG. 2B is a diagram that illustrates a memory map of a case where no hypervisor is used;

FIG. 13 is a diagram that illustrates an example of memory mapping between a VM address and a physical address in the FT server illustrated in FIG. 9;

FIG. 14 is a flowchart that illustrates the process of a DMA read request monitoring unit of the FT server illustrated in FIG. 9;

FIG. 15A is a diagram that illustrates an example of the format of a PCIe transaction request header;

FIG. 15B is a diagram that illustrates an example of the format of a PCIe transaction completion header;

FIG. 15C is a diagram that illustrates a monitoring target PCIe device management table of the DMA interrupt control unit of the FT server illustrated in FIG. 9;

FIG. 16 is a flowchart that illustrates the process of a DMA read data monitoring unit of the FT server illustrated in FIG. 9;

DESCRIPTION OF THE PREFERRED EMBODIMENTS

Hereinafter, embodiments will be described with reference to the drawings.

[1] Overview

[1-1] FT Server Using Hypervisor

Figure 1:
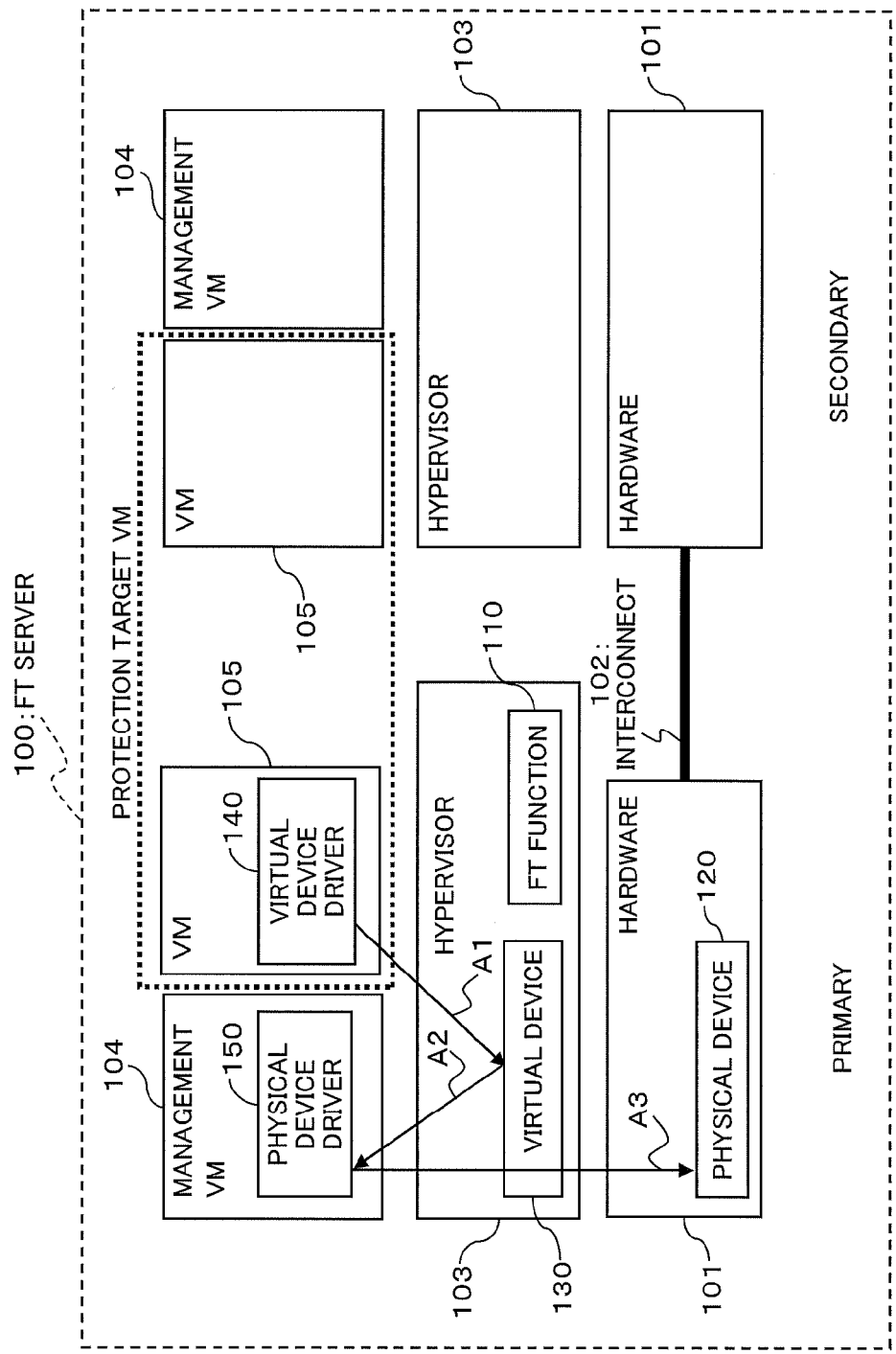
FIG. 1 is a block diagram that illustrates the concept of an FT server using a hypervisor.

A fault-tolerant server (FT server) is a computer system that includes two sets of hardware having the same configuration and, even in a case where one set of the hardware is broken down, can continue the operation using the other set thereof without allowing a user to be aware of the occurrence of the breakdown. As one method of realizing such an FT server, there is a technique using a hypervisor, and, according to the technique, a virtual machine (VM) on the hypervisor is set as a fault-tolerant target. FIG. 1 is a block diagram that illustrates the concept of an FT server using a hypervisor.

In the FT server 100 illustrated in FIG. 1, two sets of hardware 101 and 101 having the same configuration are connected together through an interconnect 102 such as Ethernet. Here, one set of the hardware 101 will be referred to as primary, and the other set of the hardware 101 will be referred to as secondary. In each of the primary and the secondary, a hypervisor 103 is built, and management VMs 104 and 105 are built by the hypervisor 103. Here, the VM 105 is a protection target, in other words, a fault-tolerant target, and an FT function 110 for the VM 105 as the target is provided in the hypervisor 103. Hereinafter, while the function, the configuration, and the operation of the primary side will be described, the function, the configuration, and the operation of the secondary side are similar to those of the primary side, and the description and the illustration thereof will not be presented.

In a case where a breakdown of the primary hardware 101 occurs, the FT function 110 serves to cause the secondary-side VM 105 to succeed the process of the primary-side VM 105. According to the FT function 110, for example, the state (the context of the CPU, the content of the memory, and the like) of the primary-side VM 105 are copied to the secondary side on a regular basis. Thus, the FT function 110 maintains the state at the time point of the copy on the secondary side such that, even in a case where the primary side is broken down, the secondary side can resume the process immediately after the occurrence of the breakdown.

[1-2] Virtualization of I/O Device Using Hypervisor

As described above, according to the technique realizing the FT server using the hypervisor, an I/O device (an input/output device, a physical device) 120 is virtualized as a virtual device 130 by the hypervisor 103, and the OS inside the VM 105 cannot directly access the I/O device 120. The I/O device 120, for example, is an Ethernet card or a fiber channel card. By virtualizing the I/O device 120, the hypervisor 103 can monitor an input/output access (I/O) according to the I/O device 120.

Here, in order to maintain the fault-tolerance, a condition that, even in a case where a breakdown occurs on the primary side immediately after an output is made from the I/O device 120 of the primary side to the outside, the process have to be succeeded by the secondary side needs to be satisfied. This condition, generally, is called an "output commit" problem. In order to respond to the "output commit" problem, when an output is made to the outside by the VM 105 of the primary side, the VM 105 of the secondary side needs to be in the same state as that of the primary side, in other words, the VMs need to be synchronized with each other.

Accordingly, a process is performed in which the hypervisor 103 monitors an I/O, and the output of the I/O device 120 is stopped until the primary state and the secondary state are synchronized with each other. In order to realize the process, the hypervisor 103 virtualizes the I/O device 120 as a virtual device 130 and performs control such that the OS on the VM 105 necessarily accesses the virtual device 130 of the hypervisor 103. Accordingly, the hypervisor 103 can check the output of the I/O device 120.

In addition, in the example illustrated in FIG. 1, a physical I/O device (physical device) 120 may be included in the hardware 101, and the hypervisor 103 virtualizes the physical device 120 as the virtual device 130. The OS on the VM 105 accesses the virtual device 130 by using the virtual device driver 140 (see arrow A1 illustrated in FIG. 1). The access to the virtual device 130 is converted into an access to the physical device 120 by a physical device driver 150 provided on the management VM 104 (see arrows A2 and A3 illustrated in FIG. 1). Due to the two-stage processing, the output performance of the I/O device 120 is degraded to be lower than that of an ordinary server.

[1-3] Performance Degradation According to Virtualization of I/O Device (Physical Device)

A data copy process accompanied with the two-stage processing described above particularly affects the performance degradation. Hereinafter, for example, the processing sequence (c1) to (c4) of a case where a network packet is output from the I/O device 120 to the outside will be described with reference to FIGS. 1 and 2A. FIG. 2A is a diagram that illustrates a memory map of a case where the hypervisor 103 is used.

(c1) As illustrated in FIG. 2A, the network packet is prepared in the memory space of the VM 105 by the virtual device driver 140.

(c2) When the virtual device driver 140 instructs the virtual device 130 to transmit a network packet (see arrow A1 illustrated in FIG. 1), the hypervisor 103 checks the instruction and copies the network packet into a memory space (reception area for receiving data from the VM 105) of the management VM 104 that can be accessed from the management VM 104 (see arrow A4 illustrated in FIG. 2A). Thereafter, the hypervisor 103 notifies the management VM 104 of the presence of the instruction for transmitting the network packet (see arrow A2 illustrated in FIG. 1).

(c3) After formatting the network packet into a format for which the network packet can be transmitted by the physical device 120, the management VM 104 copies the formatted network packet into a transmission area for the physical device 120 (see arrow A5 illustrated in FIG. 2A). Thereafter, the management VM 104 instructs the physical device 120 to transmit the packet (see arrow A3 illustrated in FIG. 1).

(c4) The physical device 120 receives the transmission instruction from the management VM 104 and performs DMA transfer of the packet data from the transmission area for the physical device 120 so as to be taken into the inside of the physical device 120 (see arrow A6 illustrated in FIG. 2A).

In FIG. 1, although a case has been described in which the physical device driver 150 is included in the management VM 104, the physical device driver 150 may be included in not the management VM 104 but the hypervisor 103.

On the other hand, in an ordinary server environment having no hypervisor, as illustrated in FIG. 2B, the physical device directly performs DMA transfer from the memory space of the OS (see arrow A7). In contrast to this, as illustrated in FIG. 1, in a case where the physical device 120 is virtualized by the hypervisor 103, processes more than those of the ordinary server environment, in other words, the two-stage processing described above is required, and accordingly, the output performance of the physical device 120 is degraded to be lower than that of an ordinary server using no hypervisor. FIG. 2B is a diagram that illustrates a memory map of a case where no hypervisor is used.

In addition, as a disadvantage according to the virtualization of the physical device, in addition to the performance degradation described above, there is a disadvantage that the kinds of usable physical devices are limited. Devices that can be used by the OS inside the VM are only physical devices that support a function for being emulating as respective virtual devices. Accordingly, in order to allow devices that are not widely used or devices of the latest technologies to be used by the OS inside the VM, emulation functions corresponding to such devices need to be developed, whereby cost and time are required.

[1-4] DMA Remapping Function

Meanwhile, in recent processors and chip sets, a function for supporting high-speed uses of physical devices using VMs is provided. Technologies for supporting such a function, for example, include a virtualization technology for directed I/O (VT-d) by Intel Corporation and an input/output memory management unit (IOMMU) by Advanced Micro Devices, Inc. In the function, a DMA remapping function is a function that allows a driver inside the OS on a VM to directly control physical devices. More specifically, the DMA remapping function operates in the following processing sequences (d1) to (d4).

Figure 3:
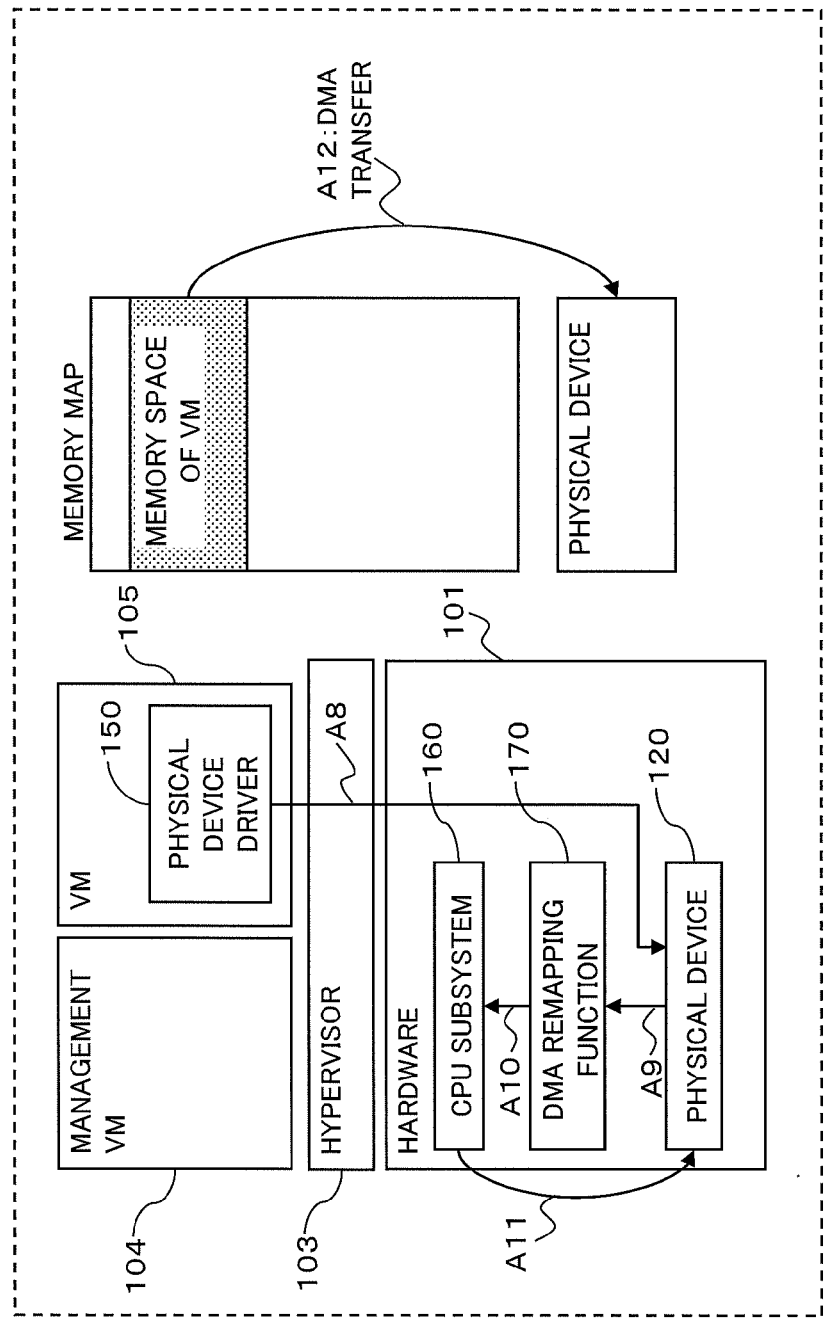
FIG. 3 is a diagram that illustrates an overview of a DMA remapping function.

FIG. 3 is a diagram that illustrates an overview of the DMA remapping function 170. In the example illustrated in FIG. 3, the physical device driver 150 is included in the VM 105 that is a protection target, and a physical device 120, a CPU subsystem 160, and the DMA remapping function 170 are included in the hardware 101. The CPU subsystem 160 is a system that is configured by a CPU and a memory.

(d1) In order to transfer data from the physical device 120 to the outside, the physical device driver 150 prepares the data in the memory space of the VM 105 and notifies the physical device 120 of the address of the memory space of the VM 105 at which the prepared data is present (see arrow A8 illustrated in FIG. 3). However, since the physical device 120 can access only an address of the physical memory space, the address of the memory space of the VM 105 needs to be converted into an address of the physical memory space in some way.

(d2) In order to transfer data, the physical device 120 issues a DMA transfer request for transferring data from an address of the memory space of the VM 105 to the CPU subsystem 160 through the DMA remapping function 170 (see arrows A9 and A10 illustrated in FIG. 3).

(d3) At this time, the DMA remapping function 170 monitors a DMA transfer request from the physical device 120 (see arrow A9 illustrated in FIG. 3). Then, when the request is received, the DMA remapping function 170 converts the address of the memory space of the VM 105 that is included in the request into an address of the physical memory space and transfers the converted address to the CPU subsystem 160 (see arrow A10 illustrated in FIG. 3).

(d4) In this way, the CPU subsystem 160 transfers the data required for the transfer from the physical memory space to the physical device 120 (see arrow A11 illustrated in FIG. 3), and the physical device 120 can directly perform DMA transfer from the memory space of the VM 105 (see arrow A12 illustrated in FIG. 3).

According to the DMA remapping function 170 described above, the two-stage processing performed by the hypervisor 103 disappears, and the OS on the VM 105 can access the physical device 120 in the same manner as that of the ordinary server, whereby performance degradation scarcely occurs.

However, in a case where the DMA remapping function 170 is used by the FT server 100, the hypervisor 103 cannot check the I/O, and accordingly, the "output commit" problem described above is not able to be responded.

[1-5] Basic Configuration

Figure 4:
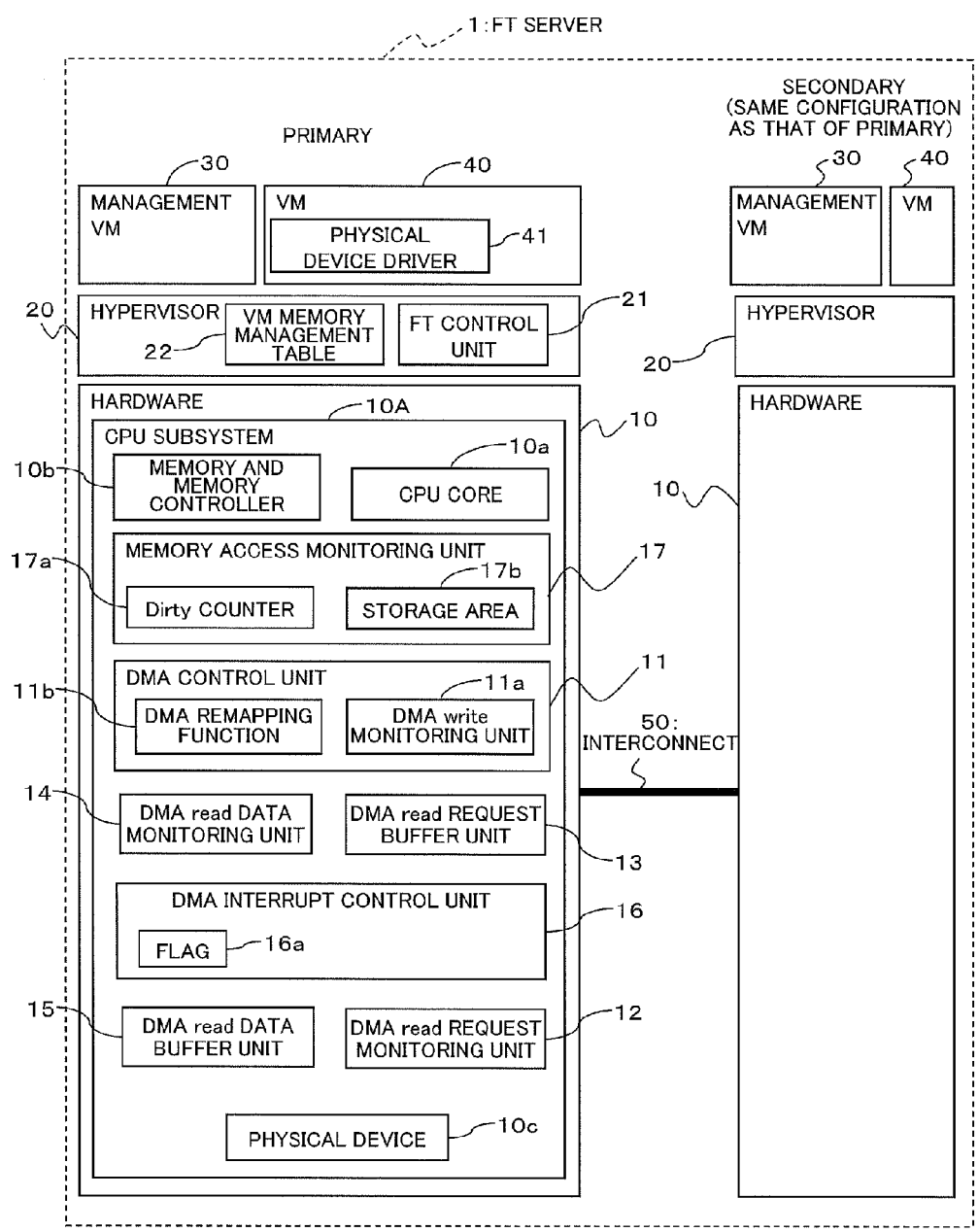
FIG. 4 is a block diagram that illustrates the hardware configuration and the functional configuration of an FT server (information processing apparatus) according to a first embodiment.
Figure 9:
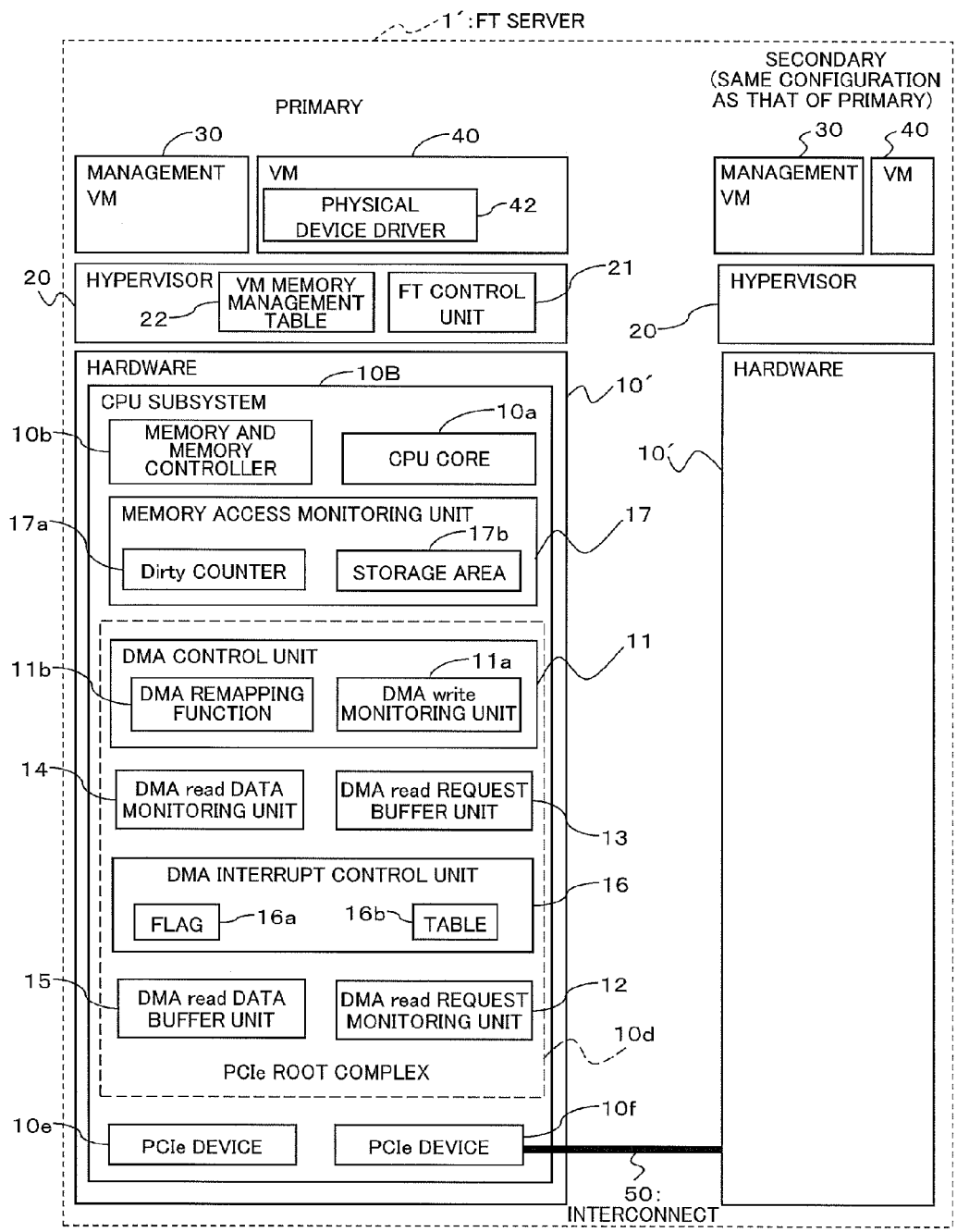
FIG. 9 is a block diagram that illustrates the hardware configuration and the functional configuration of an FT server (information processing apparatus) according to a second embodiment.

In an embodiment to be described below, a structure is provided which enables a direct operation for the physical device from the virtual machine (VM) so as to prevent the degradation of the performance of the input/output access due to an overhead of the virtualization in the FT server using the hypervisor while responding to the "output commit" problem, in other words, synchronizing the primary side and the secondary side with each other. The structure is realized by the following units (e1) to (e5). Such units (e1) to (e5), as will be described later with reference to FIG. 4 or 9, are applied to an FT server (information processing apparatus) in which a hypervisor and a virtual machine (VM) are built on the hardware. Here, the VM includes a driver (physical device driver) performing data input/output using an input/output device (an I/O device, a physical device). In addition, the hypervisor manages the VM and achieves the function of performing a synchronization process between the primary side (the information processing apparatus) and the secondary side (another information processing apparatus).

In description to be presented below, the CPU subsystem represents a CPU and a memory connected to the CPU. In addition, the CPU subsystem, as will be described later with reference to FIG. 4 or 9, mainly, includes a CPU core, a memory controller, a memory, and an interface (for example, a PCI-express root complex) connecting a physical device (I/O device) to the CPU.

(e1) A unit that monitors DMA in the CPU subsystem of the FT server, in other words, a unit that enables detection of a data output to the outside of the FT server. This unit (e1), mainly, is realized by a DMA read request monitoring unit 12 and a DMA read data monitoring unit 14 to be described later. In other words, this unit (e1) serves as a monitoring unit that monitors an access made between the memory inside the CPU subsystem and the input/output device. Particularly, the monitoring unit (unit (e1)) detects a read access relating to the data output from the memory to the input/output device. As the read access, the issuance of a read request (DMA read request) from the input/output device to the memory or reading of target data (DMA read data) for data output from the memory to the input/output device is detected.

(e2) A unit that notifies the hypervisor of the detection of data output in a case where the data output to the outside is detected in the CPU subsystem of the FT server, in other words, a unit that enables the hypervisor to detect data output for the outside. This unit (e2) is realized by a DMA interrupt control unit 16, which will be described later, notifying the hypervisor of "DMA read request detection interrupt" or "DMA read data detection interrupt". In other words, in a case where the monitoring unit (unit (e1)) detects a read access, the unit (e2) servers as a notification unit that notifies the hypervisor of the detection of the read access.

(e3) A unit that suppresses data output for the outside when the hypervisor performs a synchronization process inside the FT server in accordance with the detection of data output for the outside. By including this unit (e3) inside the CPU subsystem of the FT server, it is prevented that the synchronized state between the primary side and the secondary side is broken due to the output of data to the outside during the synchronization process. The unit (e3), mainly, is realized by a DMA read request buffering unit 13 and a DMA read data buffering unit 15 to be described later. In other words, in a case where the hypervisor is in the middle of execution of the synchronization process when receiving a notification from the notification unit (unit (e2)), the unit (e3) serves as a suppression unit that suppresses data output. In addition, when the hypervisor ends the synchronization process, the suppression unit (unit (e3)) releases the suppression of data output. Particularly, the suppression unit (unit (e3)) suppresses data output by temporarily maintaining the read request or the target data in the buffering unit 13 or 15. Then, when the hypervisor ends the synchronization process, the suppression unit (unit (e3)) transmits the read request from the buffering unit 13 to the memory side or transmits the target data from the buffering unit 15 to the input/output device.

(e4) A unit that monitors and records a DMA from the I/O device to the memory of the VM provided by the hypervisor. By including this unit (e4) inside the CPU subsystem of the FT server, the hypervisor can acquire the information of the memory that is required for performing the synchronization process. The unit (e4), mainly, is realized by a DMA write monitoring unit 11a to be described later. The function of the unit (e4) is included in the monitoring unit. In a case where a write access relating to data writing from the input/output device to the memory is detected, the monitoring unit (unit (e4)) records the occurrence of a change in data corresponding to an address relating to the data writing in a table (a VM memory management table 22 to be described later) that manages the memory. The hypervisor performs the synchronization process based on the table described above. Particularly, the monitoring unit (unit (e4)) records the occurrence of the change by setting a change bit (a dirty bit to be described later) in the table described above, and, when the synchronization process ends, the hypervisor clears the change bit.

(e5) A unit that does not notify the hypervisor of data output for the outside when the synchronization process is not necessary. By including this unit (e5) inside the CPU subsystem of the FT server, an unnecessary synchronization process is suppressed, and the performance of the whole FT server is improved. This unit (e5), mainly, is realized by the DMA read request monitoring unit 12, the DMA read data monitoring unit 14, a dirty counter 17a and a storage area 17b to be described later. Here, the counter 17a counts the number of places at which a change in data occurs in the memory. The storage area 17b stores a count value of the counter 17a that is referred to at the time of performing the previous synchronization process. In a case where the hypervisor is not in the middle of execution of the synchronization process when the notification from the notification unit (unit (e2)) is received, the monitoring unit (unit (e1)) compares the value of the counter 17a with the count value stored in the storage area 17b. In a case where the value of the counter 17a and the count value stored in the storage area 17b do not coincide with each other, the monitoring unit (unit (e1)) causes the suppression unit (unit (e3)) to suppress data output and causes the hypervisor to perform a synchronization process. On the other hand, in a case where the value of the counter 17a and the count value stored in the storage area 17b coincide with each other, the monitoring unit (unit (e1)) performs data output without causing the suppression unit (unit (e3)) to suppress the data output.

In addition, in the DMA interrupt control unit 16, which will be described later, that realizes the unit (e2), an interrupt factor flag 16a is included. The interrupt factor flag 16a is set in a case where the monitoring unit (unit (e1)) generates an interrupt due to the detection of a read access so as to cause the hypervisor to perform a synchronization process. Meanwhile, the interrupt factor flag 16a is cleared when the hypervisor ends the synchronization process. Then, the monitoring unit (unit (e1)) determines the hypervisor to be in the middle of execution of the synchronization process in a case where the interrupt factor flag 16a is set and determines the hypervisor not to be in the middle of execution of the synchronization process in a case where the interrupt factor flag 16a is not set.

By including the above-described units (e1) to (e5), the hypervisor can detect the output of data to the outside without emulating the I/O device as a virtual device. Accordingly, the hypervisor does not need to emulate the I/O device as a virtual device, and the physical device driver inside the VM, which is provided by the hypervisor, can directly operate the I/O device, whereby the performance of the output of data to the outside is improved. In this way, the input/output access performance of the VM is improved.

In addition, by including the above-described units (e1) to (e5), without arranging an emulation function corresponding to the physical device used by the FT server, even a device that is not widely used or a device of a latest technology can be used by the OS inside VM. Accordingly, in the FT server using the hypervisor, a physical device of the same kind as that of the physical device used in an ordinary server can be easily handled.

In addition, the FT servers according to these embodiments first and second embodiments to be described later can be applied also to a configuration including an I/O device inside the CPU subsystem. In other words, the FT servers according to these embodiments can be applied also to a configuration employing a CPU formed as an SoC, whereby the FT servers having high performance can be realized.

[2] FT Server According to First Embodiment

Hereinafter, an FT server (information processing apparatus) 1 according to a first embodiment will be described with reference to FIGS. 4 to 8.

[2-1] Configuration of FT Server According to First Embodiment

First, the configuration of the FT server 1 according to the first embodiment will be described with reference to FIG. 4. FIG. 4 is a block diagram that illustrates the hardware configuration and the functional configuration of the FT server 1 according to the first embodiment.

In the FT server 1 according to the first embodiment illustrated in FIG. 4, two sets of hardware 10 and 10 having the same configuration are interconnected through an interconnect 50 such as Ethernet. Here, one set of the hardware 10 will be referred to as primary and the other set of the hardware 10 will be referred to as secondary. In each of the primary and the secondary, a hypervisor 20 is built, and management VMs 30 and 40 are built by the hypervisor 20. Hereinafter, while the function, the configuration, and the operation of the primary side will be described, the function, the configuration, and the operation of the secondary side are similar to those of the primary side, and thus, the description and the illustration thereof will not be presented.

Here, the VM 40 is a protection target, in other words, a fault-tolerant target, and a physical device driver 41 controlling a physical device 10c to be described later is included inside the OS on the VM 40, and the VM 40 can directly control the physical device 10c. In addition, in the hypervisor 20, an FT control unit 21 that performs control of the FT for the VM 40 as a target and a VM memory management table 22 that manages the VM memory space (memory 10b) are included.

The FT control unit 21 serves to cause the VM 40 of the secondary side to succeed the process of the VM 40 of the primary side in a case where a breakdown occurs in the hardware 10 of the primary side. The FT control unit 21 performs a synchronization process between the primary side and the secondary side, for example, by regularly copying the state (the context of the CPU, the content of the memory, and the like) of the VM 40 of the primary side to the secondary side. In this way, the FT control unit 21 maintains the state at the time point of the copy process on the secondary side and enables the secondary side to resume the process immediately after the occurrence of a breakdown even when the primary side is broken down.

In the hardware 10, a CPU subsystem 10A that is configured by a CPU and a memory is included. The CPU subsystem 10A includes a CPU core 10a, a memory, a memory controller 10b, and a physical device 10c. In other words, the FT server 1 according to the first embodiment is applied to a configuration that employs a CPU formed as the SoC. In addition, the CPU subsystem 10A includes a DMA control unit 11, a DMA read request monitoring unit 12, a DMA read request buffering unit 13, a DMA read data monitoring unit 14, a DMA read data buffering unit 15, a DMA interrupt control unit 16, and a memory access monitoring unit 17.

The physical device 10c is an I/O device that outputs data to an external network such as Ethernet and, for example, is an Ethernet card or a fiber channel card. In this embodiment, although the physical device 10c has been described to be included inside the CPU subsystem 10A, the physical device 10c may be disposed outside the CPU subsystem 10A.

The DMA control unit 11 controls a DMA that is performed between the physical device 10c and the memory 10b provided inside the CPU subsystem 10A and includes a DMA write monitoring unit 11a and a DMA remapping function 11b.

The DMA write monitoring unit (monitoring unit) 11a achieves the function of the above-described unit (e4) and monitors DMA write (in other words, recording data from the physical device 10c into the memory 10b) and records the occurrence of a change in the content of the memory 10b in the VM memory management table 22. More specifically, in a case where write access relating to data writing from the physical device 10c to the memory 10b is detected, the DMA write monitoring unit 11a records the occurrence of a change in data corresponding to an address relating to the data writing in the VM memory management table (for example, an Intel extended page table) 22. At this time, the DMA write monitoring unit 11a records the occurrence of the change by setting "1" to a dirty bit (change bit; see FIG. 20) corresponding to the address described above in the VM memory management table 22. The FT control unit 21 of the hypervisor 20 performs a synchronization process by transferring and copying the data in which the change occurs from the primary side to the secondary side in accordance with the VM memory management table 22 and clears the dirty bit to "0" when the synchronization process ends.

The DMA remapping function 11b, similar to the DMA remapping function 170 described above with reference to FIG. 3 (see the above-described processing sequences (d1) to (d4)), is a function that enables the physical device driver 41 inside the OS on the VM 40 to directly control the physical device 10c.

The DMA read request monitoring unit (monitoring unit) 12 achieves the functions of the above-described units (e1) and (e5). The DMA read request monitoring unit 12 monitors a DMA read request (a read request from the physical device 10c to the memory 10b) that is issued from the physical device 10c to the DMA control unit 11 when the physical device 10c outputs data to the outside. In addition, the DMA read request monitoring unit 12 compares the count value of the counter 17a, which has been referred to at the time of performing the previous synchronization process, stored in the storage area 17b (to be described later) with the current value of the dirty counter 17a (to be described later). In a case where the current value of the counter 17a and the count value stored in the storage area 17b do not coincide with each other, the DMA read request monitoring unit 12 determines a state in which a change in the data of the memory 10b has been performed, and the primary side and the secondary side are not synchronized with each other. Then, the DMA read request monitoring unit 12 suppresses the output of data to the outside by storing the DMA read request in the DMA read request buffering unit 13 (to be described later). In addition, the DMA read request monitoring unit 12 notifies the hypervisor 20 of the detection of the DMA read request (read access) (DMA read request detection interrupt) through the DMA interrupt control unit 16, so that the FT control unit 21 of the hypervisor 20 is caused to perform a synchronization process. On the other hand, in a case where the current value of the counter 17a and the count value stored in the storage area 17b coincide with each other, the DMA read request monitoring unit 12 determines a state in which the primary side and the secondary side are synchronized with each other. Then, the DMA read request monitoring unit 12 outputs data to the outside without storing the DMA read request in the DMA read request buffering unit 13 (to be described later). In addition, the DMA read request monitoring unit 12, as will be described later in Section [2-2-2], also has a function for monitoring and detecting a DMA write request for transferring data from the physical device 10c to the memory 10b.

The DMA read request buffering unit (a suppression unit, a buffer) 13 achieves the function of the above-described unit (e3) and is a buffer that stores a DMA read request issued from the physical device 10c to the DMA control unit 11. In other words, in a case where the hypervisor 20 is in the middle of execution of the synchronization process when a notification of the "DMA read request detection interrupt" is received from the DMA interrupt control unit 16, the DMA read request buffering unit 13 suppresses the output of data to the outside by temporarily maintaining the DMA read request. Then, the DMA read request buffering unit 13 transfers the maintained DMA read request to the DMA control unit 11 (the memory 10b side) in accordance with an instruction from the DMA interrupt control unit 16 (to be described later) accompanied with the end of the synchronization process that is performed by the hypervisor 20 (FT control unit 21).

The DMA read data monitoring unit (monitoring unit) 14 achieves the functions of the above-described units (e1) and (e5). The DMA read data monitoring unit 14 monitors reading of DMA read data (target data for the output of data from the memory 10b to the physical device 10c) read from the memory controller (memory) 10b into the physical device 10c. In addition, the DMA read data monitoring unit 14, similar to the DMA read request monitoring unit 12, compares the count value of the counter 17a, which has been referred to at the time of performing the previous synchronization process, stored in the storage area 17b (to be described later) with the current value of the dirty counter 17a (to be described later). In a case where the current value of the counter 17a and the count value stored in the storage area 17b do not coincide with each other, the DMA read data monitoring unit 14 determines a state in which a change in the data of the memory 10b has been made, and the primary side and the secondary side are not synchronized with each other. Then, the DMA read data monitoring unit 14 suppresses the output of data to the outside by storing DMA read data in the DMA read data buffering unit 15 (to be described later). In addition, the DMA read data monitoring unit 14 notifies the hypervisor 20 of the detection of the DMA read data (read access) (DMA read data detection interrupt) through the DMA interrupt control unit 16, so that the FT control unit 21 of the hypervisor 20 is caused to perform a synchronization process. On the other hand, in a case where the current value of the counter 17a and the count value stored in the storage area 17b coincide with each other, the DMA read data monitoring unit 14 determines a state in which the primary side and the secondary side are synchronized with each other. Then, the DMA read data monitoring unit 14 outputs data to the outside without storing the DMA read data in the DMA read data buffering unit 15 (to be described later).

The DMA read data buffering unit (a suppression unit, a buffer) 15 achieves the function of the above-described unit (e3) and is a buffer that stores DMA read data read from the memory controller (memory) 10b into the physical device 10c. In other words, in a case where the hypervisor 20 is in the middle of execution of the synchronization process when a notification of the "DMA read data detection interrupt" is received from the DMA interrupt control unit 16, the DMA read data buffering unit 15 suppresses the output of data to the outside by temporarily maintaining the DMA read data. Then, the DMA read data buffering unit 15 transfers the maintained DMA read data to the physical device 10c in accordance with an instruction from the DMA interrupt control unit 16 (to be described later) accompanied with the end of the synchronization process that is performed by the hypervisor 20 (FT control unit 21).

The DMA interrupt control unit (notification unit) 16 achieves the function of the above-described unit (e2). The DMA interrupt control unit 16 generates an interrupt for notifying the hypervisor 20 of the detection of a DMA read request. In addition, the DMA interrupt control unit 16 generates an interrupt for notifying the hypervisor 20 of the detection of DMA read data. In other words, in a case where the monitoring unit 12 or 14 detects a DMA read request or DMA read data, the DMA interrupt control unit 16 determines that a read access outputting data to the outside has been detected and notifies the hypervisor 20 of the detection of the read access as an "DMA read request detection interrupt" or a "DMA read data detection interrupt".

In addition, the DMA interrupt control unit 16 has the interrupt factor flag 16a. The interrupt factor flag 16a is set in a case where the monitoring unit 12 or 14 causes the DMA interrupt control unit 16 to generate an interrupt so that the hypervisor 20 (FT control unit 21) performs a synchronization process. On the other hand, when the hypervisor 20 (FT control unit 21) ends the synchronization process, the interrupt factor flag 16a is cleared. When the interrupt factor flag 16a is cleared, the DMA interrupt control unit 16 instructs the buffering units 13 and 15 to transfer the DMA read request and the DMA read data that have been maintained. The monitoring units 12 and 14 determine that the hypervisor 20 is in the middle of execution of the synchronization process in a case where the interrupt factor flag 16a is set and determines that the hypervisor 20 is not in the middle of execution of the synchronization process in a case where the interrupt factor flag 16a is not set (cleared state).

The memory access monitoring unit 17 monitors an access to the memory 10b of the CPU (CPU core 10a) and, when the content of the memory 10b is changed, records the occurrence of the change in the content of the memory 10b in the VM memory management table 22. At this time, similar to the DMA write monitoring unit 11a described above, when the content of the memory 10b is changed, the memory access monitoring unit 17 records the occurrence of the change by setting the dirty bit (change bit; see FIG. 20) corresponding to an address relating to the change in the content to "1" in the VM memory management table 22. The FT control unit 21 of the hypervisor 20 performs a synchronization process by transferring and copying the data in which the change occurs from the primary side to the secondary side in accordance with the VM memory management table 22 and clears the dirty bit to "0" when the synchronization process ends.

In addition, the memory access monitoring unit 17 includes the dirty counter 17a and the storage area 17b. The dirty counter 17a counts the number of places at which a change in data has occurred in the memory 10b. The storage area 17b stores a count value of the counter 17a that is referred to at the time of performing the previous synchronization process by the monitoring unit 12 or 14. In a case where the hypervisor 20 is not in the middle of execution of the synchronization process when the notification from the DMA interrupt control unit 16 is received, the monitoring unit 12 or 14 compares the current value of the dirty counter 17a with the count value stored in the storage area 17b. In a case where the value of the dirty counter 17a and the count value stored in the storage area 17b do not coincide with each other, the monitoring unit 12 or 14 causes the buffering unit 13 or 15 to suppress data output and causes the hypervisor 20 to perform a synchronization process. On the other hand, in a case where the value of the dirty counter 17a and the count value stored in the storage area 17b coincide with each other, the monitoring unit 12 or 14 outputs data to the outside without storing the DMA read request or the DMA read data in the buffering unit 13 or 15.

[2-2] Operation of FT Server According to First Embodiment

Next, the operation of the above-described FT server 1 according to the first embodiment will be described with reference to FIGS. 4 to 8.

[2-2-1] Operation of Checking Output of Data to Outside

Here, first, in the FT server 1 illustrated in FIG. 4, at the time of performing the process of transferring data from the memory 10b to the physical device 10c, an operation (Sequences 1 to 15 described below) of checking the output of data to the outside will be described. The process described above, for example, corresponds to a process of transferring a network packet on the memory 10b to a network card 10c so as to output the network packet from the physical device 10c that is the network card to the outside.

According to the first embodiment, the following two points (f1) and (f2) are acquired together through Sequences 1 to 15 described below.

(f1) Directly operating physical device driver 41 inside VM 40 for physical device 10c.

(f2) Checking read access (issuance of DMA read request or reading of DMA read data) relating to output of data to the outside so as to respond to above-described "output commit" problem using FT control unit 21 of hypervisor 20.

Sequence 1: The physical device driver 41 prepares data to be transmitted to the outside through the physical device 10c on the memory 10b as a network packet and instructs the physical device 10c to transfer the data.

Sequence 2: The physical device 10c transmits a DMA read request for acquiring data from the memory 10b to the DMA control unit 11.

Sequence 3: The DMA read request monitoring unit 12 provided between the physical device 10c and the DMA control unit 11 detects a DMA read request from the physical device 10c. Here, in a case where the FT control unit 21 is required to perform a synchronization process, it is necessary for the DMA read request monitoring unit 12 to instruct the FT control unit 21 to start synchronization control. Accordingly, the DMA read request monitoring unit 12, first, checks whether or not the FT control unit 21 is already in the middle of execution of the synchronization process. More specifically, the DMA read request monitoring unit 12 checks whether or not the interrupt factor flag 16a is not cleared to remain in the DMA interrupt control unit 16. When the interrupt factor flag 16a is not cleared to remain, in other words, when the interrupt factor flag 16a is set, the FT control unit 21 can be regarded to be in the middle of the synchronization process, and accordingly, the DMA process is required to be deferred so as to respond to the "output commit" problem. Accordingly, the DMA read request monitoring unit 12 transfers a DMA read request to the DMA read request buffering unit 13 so as to be stored. In this way, the output of data from the physical device 10c to the outside is suppressed. On the other hand, when the interrupt factor flag 16a is cleared, the FT control unit 21 can be regarded not to be in the middle of execution of the synchronization process. In such a case, in order to check whether it is necessary to perform the synchronization process, the DMA read request monitoring unit 12 refers to the dirty counter 17a and compares the current value of the dirty counter 17a with the value (the value stored in the storage area 17b) of the dirty counter 17a at the time of previous reference. In a case where the current value of the dirty counter 17a and the value stored in the storage area 17b are different from each other, it can be regarded that a memory difference for which the synchronization process performed by the FT control unit 21 is necessary is present on the VM memory 10b. Thus, the DMA read request monitoring unit 12, in order to cause the FT control unit 21 to perform the synchronization process, requests the DMA interrupt control unit 16 to generate a DMA read request detection interrupt for the hypervisor 20. At this time, the interrupt factor flag 16a of the DMA interrupt control unit 16 is set. Thereafter, the DMA read request monitoring unit 12 transfers a DMA read request to the DMA read request buffering unit 13 so as to be maintained. In this way, the output of data to the outside from the physical device 10c is suppressed. On the other hand, in a case where the current value of the dirty counter 17a and the value stored in the storage area 17b are the same, it can be regarded that the primary side and the secondary side are synchronized with each other. Accordingly, the DMA read request monitoring unit 12 transmits the DMA read request to the DMA control unit 11 so as to perform the output of data to the outside without storing the DMA read request in the DMA read request buffering unit 13.

Sequence 4: The DMA interrupt control unit 16 transmits a DMA read request detection interrupt to an interrupt transmission destination set by the FT control unit 21 of the hypervisor 20 in advance. In addition, the DMA interrupt control unit 16, for example, determines the interrupt transmission destination by referring to a monitoring target PCIe device management table 16*b*, which will be described later with reference to FIGS. 15A to 15C, set by the FT control unit 21.

Sequence 5: The CPU that has received the DMA read request detection interrupt moves the control from the VM 40 to the hypervisor 20. In a case where the interrupt factor is determined to be the DMA read request detection interrupt, the FT control unit 21 of the hypervisor 20 performs the synchronization process. In other words, the FT control unit 21 refers to a memory change record that is recorded in the VM memory management table 22 and transmits all the changed content (a memory difference until this synchronization process is performed after the previous synchronization process is performed) of the memory from the primary side to the secondary side through the interconnect 50. In addition, the context of the CPU is transmitted from the primary side to the secondary side.

Sequence 6: The FT control unit 21 of the hypervisor 20 of the secondary side receives the information of the memory difference and the context of the CPU from the primary side and reflects the received information on the memory and the CPU of the VM 40 of the secondary side. Thereafter, the FT control unit 21 of the hypervisor 20 of the secondary side returns a reply to the primary side through the interconnect 50. In order to increase the speed of the synchronization process, the reply to the primary side may be made immediately after the information of the memory difference and the context of the CPU is received.

Sequence 7: When the reply from the secondary side is received, the FT control unit 21 of the hypervisor 20 of the primary side regards the synchronization process as being completed and clears the interrupt factor flag 16*a* of the DMA interrupt control unit 16.

Sequence 8: When the output of data to the outside is to be suppressed, the DMA read request buffering unit 13 stores the DMA read request. The transmission of the stored DMA read request from the DMA read request buffering unit 13 to the DMA control unit 11 is triggered when the FT control unit 21 completes the synchronization process and instructs the DMA interrupt control unit 16 to clear the interrupt factor flag 16*a*. At this time, the DMA read request buffering unit 13 transmits a DMA read request to the DMA control unit 11 in accordance with an instruction, which is transmitted from the DMA interrupt control unit 16, according to the end of the synchronization process in the FT control unit 21.

Sequence 9: The DMA control unit 11 converts an address included inside the DMA read request from a VM address space to a physical address space by using the DMA remapping function 11*b*. In other words, the DMA control unit 11 converts the address included in the DMA read request by referring to a conversion table (for example, an Intel VT-d DMA remapping table) between the VM memory address and the physical memory address, which is prepared by the FT control unit 21 of the hypervisor 20 in advance.

Then, the DMA control unit 11 transmits a memory access request to the memory controller (memory) 10*b* and receives data from the memory controller (memory) 10*b*.

Sequence 10: The DMA control unit 11 transmits the data received from the memory 10*b* in Sequence 9 to the physical device 10*c* as DMA read data. Actually, the DMA read data is transferred to the DMA read data monitoring unit 14.

Sequence 11: The DMA read data monitoring unit 14 checks whether or not the interrupt factor flag is not cleared to remain in the DMA interrupt control unit 16 every time when one piece of the DMA read data is received. When the interrupt factor flag 16*a* is not cleared to remain, the FT control unit 21 is in the middle of the synchronization process, and accordingly, the DMA process needs to be deferred so as to respond to the "output commit" problem. Accordingly, the DMA read data monitoring unit 14 transfers the DMA read data to the DMA read data buffering unit 15 so as to be stored therein. In this way, the output of data from the physical device 10*c* to the outside is suppressed. On the other hand, when the interrupt factor flag 16*a* is cleared, the FT control unit 21 can be regarded not in the middle of execution of the synchronization process. In such a case, in order to check whether or not the synchronization process needs to be performed, the DMA read data monitoring unit 14 refers to the dirty counter 17*a* and compares the current value of the dirty counter 17*a* with the value (the value stored in the storage area 17*b*) of the dirty counter 17*a* at the time of the previous reference. In a case where the current value of the dirty counter 17*a* and the value stored in the storage area 17*b* are different from each other, it can be regarded that a memory difference for which the synchronization process performed by the FT control unit 21 is required is present on the VM memory 10*b*. Thus, the DMA read data monitoring unit 14 requests the DMA interrupt control unit 16 to generate a DMA read data detection interrupt for the hypervisor 20, so that the synchronization process is performed by the FT control unit 21. At this time, the interrupt factor flag 16*a* of the DMA interrupt control unit 16 is set. Thereafter, the DMA read data monitoring unit 14 transfers the DMA read data to the DMA read data buffering unit 15 so as to be stored therein. Accordingly, the output of data from the physical device 10*c* to the outside is suppressed. On the other hand, in a case where the current value of the dirty counter 17*a* and the value stored in the storage area 17*b* are the same, it can be regarded that the primary side and the secondary side are synchronized with each other. Accordingly, the DMA read data monitoring unit 14 transmits the DMA read data to the physical device 10*c* without storing the DMA read data in the DMA read data buffering unit 15 so as to output the data to the outside.

Sequence 12: The DMA interrupt control unit 16 transmits a DMA read data detection interrupt to an interrupt transmission destination set in advance by the FT control unit 21 of the hypervisor 20. At this time, similar to Sequence 4, the DMA interrupt control unit 16, for example, determines the interrupt transmission destination by referring to the monitoring target PCIe device management table 16*b*, which will be described later with reference to FIGS. 15A to 15C, set by the FT control unit 21.

Sequence 13: The CPU that has received the DMA read data detection interrupt moves the control from the VM 40 to the hypervisor 20. Thereafter, the FT control unit 21 of the hypervisor 20 performs a synchronization process in the same sequence as Sequences 5 to 7 described above.

Sequence 14: When the output of data to the outside is to be suppressed, the DMA read data buffering unit 15 stores the DMA read data. The transmission of the stored DMA read data from the DMA read data buffering unit 15 to the physical device 10c is triggered when the FT control unit 21 completes the synchronization process and instructs the DMA interrupt control unit 16 to clear the interrupt factor flag 16a. At this time, the DMA read data buffering unit 15 transmits DMA read data to the physical device 10c in accordance with an instruction, which is transmitted from the DMA interrupt control unit 16, according to the end of the synchronization process in the FT control unit 21.

Sequence 15: The physical device 10c receives the DMA read data and transfers the DMA read data, thereby completing the DMA transfer.

According to Sequences 1 to 15 described above, while the physical device driver 41 on the VM 40 directly operates the physical device 10c, a read access relating to the output of data to the outside is detected, and a required synchronization process can be performed before the output of data to the outside.

[2-2-2] Operation of Checking Memory Difference According to DMA Write Transfer

Next, in the FT server 1 illustrated in FIG. 4, at the time of transferring data from the physical device 10c to the memory 10b, the operation (Sequences 21 to 24 described below) of checking a memory difference according to the DMA write transfer will be described. The above-described process, for example, corresponds to a process in which the physical device 10c that is a network card receives a network packet from the outside, and the network packet is transferred from the network card 10c to the memory 10b.

In the first embodiment, according to Sequences 21 to 24 described below, the FT control unit 21 of the hypervisor 20 can check data transferred from the physical device 10c to the memory of the VM 40 through a DMA transfer as a memory difference.

According to existing technologies, since the hypervisor 20 receives data from the physical device 10c, and the hypervisor 20 writes received data into the memory of the VM 40, the hypervisor 20 acquires a memory difference changed after the previous synchronization process. However, according to this embodiment, since data is directly written into the memory of the VM 40 from the physical device 10c not through the hypervisor 20, the position (address) and the amount of data written in accordance with the following Sequences 21 to 24 need to be acquired by the hypervisor 20 later.

Sequence 21: The physical device 10c transmits a DMA write request to the memory address of the VM 40.

Sequence 22: The DMA read request monitoring unit 12 transmits the DMA write request to the DMA control unit 11.

Sequence 23: The DMA remapping function 11b of the DMA control unit 11 refers to the conversion table between the VM memory address and the physical address, which is prepared in advance by the FT control unit 21 of the hypervisor 20, and performs conversion of the address included inside the DMA write request. In other words, the DMA remapping function 11b converts the physical address included inside the DMA write request into a VM memory address.

Sequence 24: The DMA write monitoring unit 11a refers to the VM memory management table 22 of the hypervisor 20 and sets "1" to a dirty bit (change bit; see FIG. 20) corresponding to the address included inside the DMA write request in the table 22. Accordingly, the occurrence of a change in the data corresponding to the address included inside the DMA write request is recorded in the VM memory management table 22. Thereafter, the DMA write monitoring unit 11a transmits a memory access request to the memory controller (memory) 10b.

According to Sequences 21 to 24 described above, the occurrence of a change in the memory is recorded in the VM memory management table 22, and accordingly, at the time of performing the synchronization process, the FT control unit 21 of the hypervisor 20 can reliably acquire a change difference in the memory to be transferred from the primary side to the secondary side.

[2-2-3] Operation of DMA Read Request Monitoring Unit

Figure 5:
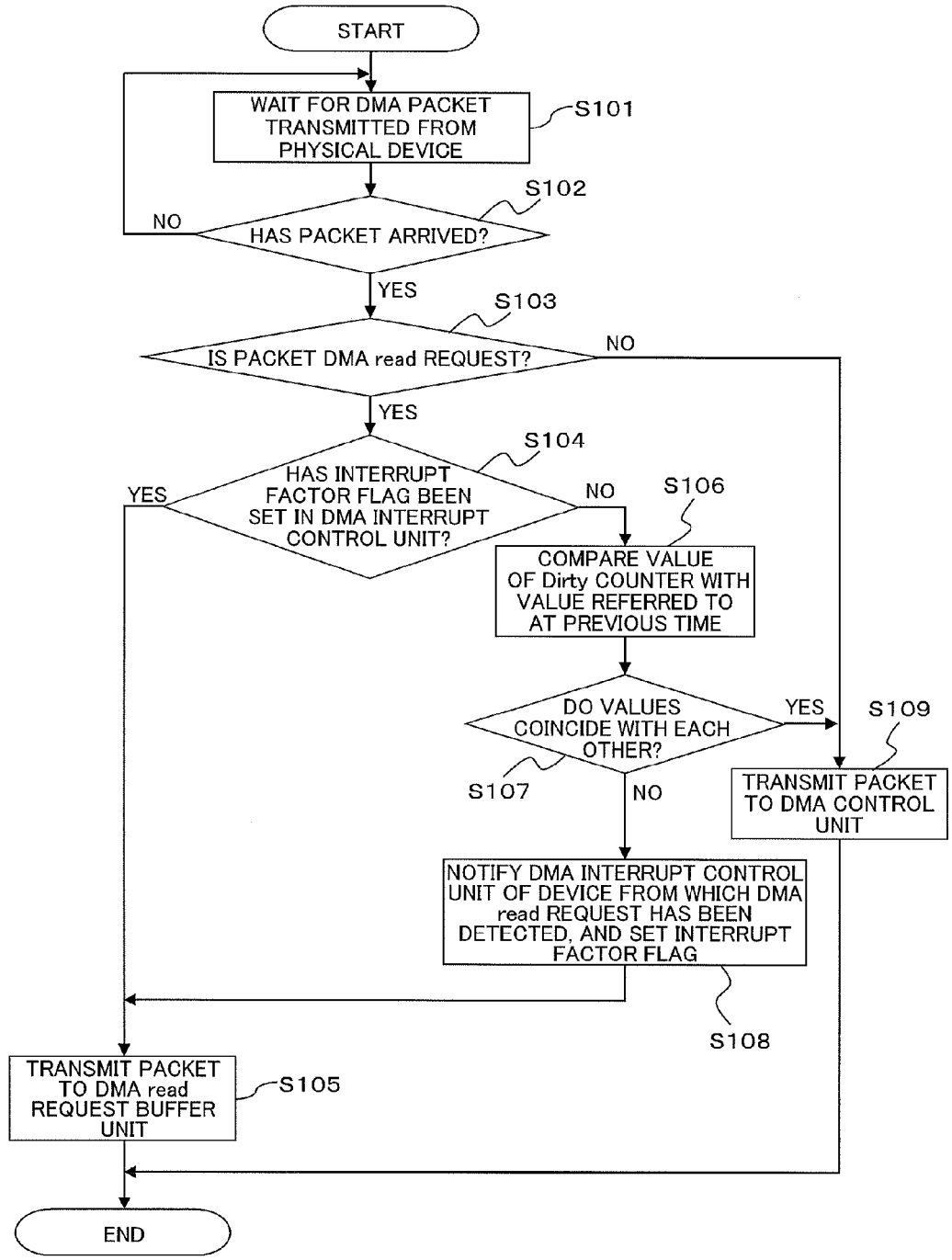
FIG. 5 is a flowchart that illustrates the process of a DMA read request monitoring unit of the FT server illustrated in FIG. 4.

Next, the process (operation) of the DMA read request monitoring unit 12 of the FT server 1 illustrated in FIG. 4 will be described along a flowchart (Steps S101 to S109) illustrated in FIG. 5. The process (operation) of the DMA read request monitoring unit 12 described here is performed in the above-described Sequence 3.

The DMA read request monitoring unit 12 waits for a DMA packet transmitted from the physical device 10c in Step S101. In a case where any DMA packet is not received (No route of Step S102), the process is returned to Step S101. On the other hand, in a case where a DMA packet is received (Yes route of Step S102), the DMA read request monitoring unit 12 determines whether or not the received DMA packet is a DMA read request in Step S103.

In a case where the DMA packet is not a DMA read request (No route of Step S103), the DMA read request monitoring unit 12 outputs the received DMA packet to the DMA control unit 11 in Step S109, and the process ends.

On the other hand, in a case where the DMA packet is a DMA read request (Yes route of Step S103), the DMA read request monitoring unit 12 determines whether or not the interrupt factor flag 16a according to the detection of the DMA read request is set in the DMA interrupt control unit 16 in Step S104. In a case where the interrupt factor flag 16a is set (Yes route of Step S104), the DMA read request monitoring unit 12 regards the FT control unit 21 to be in the middle of the synchronization process and transfers the received DMA packet, in other words, the DMA read request to the DMA read request buffering unit 13 so as to be stored therein in Step S105, and the process ends. Accordingly, the output of data from the physical device 10c to the outside is suppressed.

On the other hand, in a case where the interrupt factor flag 16a is not set (No route of Step S104), the DMA read request monitoring unit 12 regards the FT control unit 21 not to be in the middle of execution of the synchronization process. Then, in order to check whether or not the synchronization process needs to be performed, the DMA read request monitoring unit 12 refers to the dirty counter 17a and compares the current value of the dirty counter 17a with the value (the value stored in the storage area 17b) of the dirty counter 17a at the time of the previous reference in Step S106.

In a case where the current value of the dirty counter 17a and the value stored in the storage area 17b do not coincide with each other (No route of Step S107), the DMA read request monitoring unit 12 regards a memory difference for which the synchronization process performed by the FT control unit 21 is necessary to be present on the VM memory 10b. Then, the DMA read request monitoring unit 12 notifies the DMA interrupt control unit 16 of a device (a physical device 10c) from which the DMA read request has been detected and sets the interrupt factor flag 16a in Step S108. Accordingly, a DMA read request detection interrupt is generated from the DMA interrupt control unit 16 for the hypervisor 20, and the FT control unit 21 performs a synchronization process. In addition, after the completion of the comparison between the current value of the dirty counter 17a with the value stored in the storage area 17b, the DMA read request monitoring unit 12 instructs the memory access monitoring unit 17 to replace the value stored in the storage area 17b with the current value of the dirty counter 17a.

Thereafter, the DMA read request monitoring unit 12 transfers the received DMA packet, in other words, the DMA read request to the DMA read request buffering unit 13 so as to be stored therein in Step S105, and the process ends. Accordingly, the output of data from the physical device 10c to the outside is suppressed.

In a case where the current value of the dirty counter 17a and the value stored in the storage area 17b coincide with each other (Yes route of Step S107), the DMA read request monitoring unit 12 regards the primary side and the secondary side to be synchronized with each other. Then, the DMA read request monitoring unit 12 transfers the DMA read request to the DMA control unit 11 without storing the DMA read request in the DMA read request buffering unit 13 in Step S109, and the process ends. Accordingly, the output of data from the physical device 10c to the outside is performed.

[2-2-4] Operation of DMA Read Data Monitoring Unit

Figure 6:
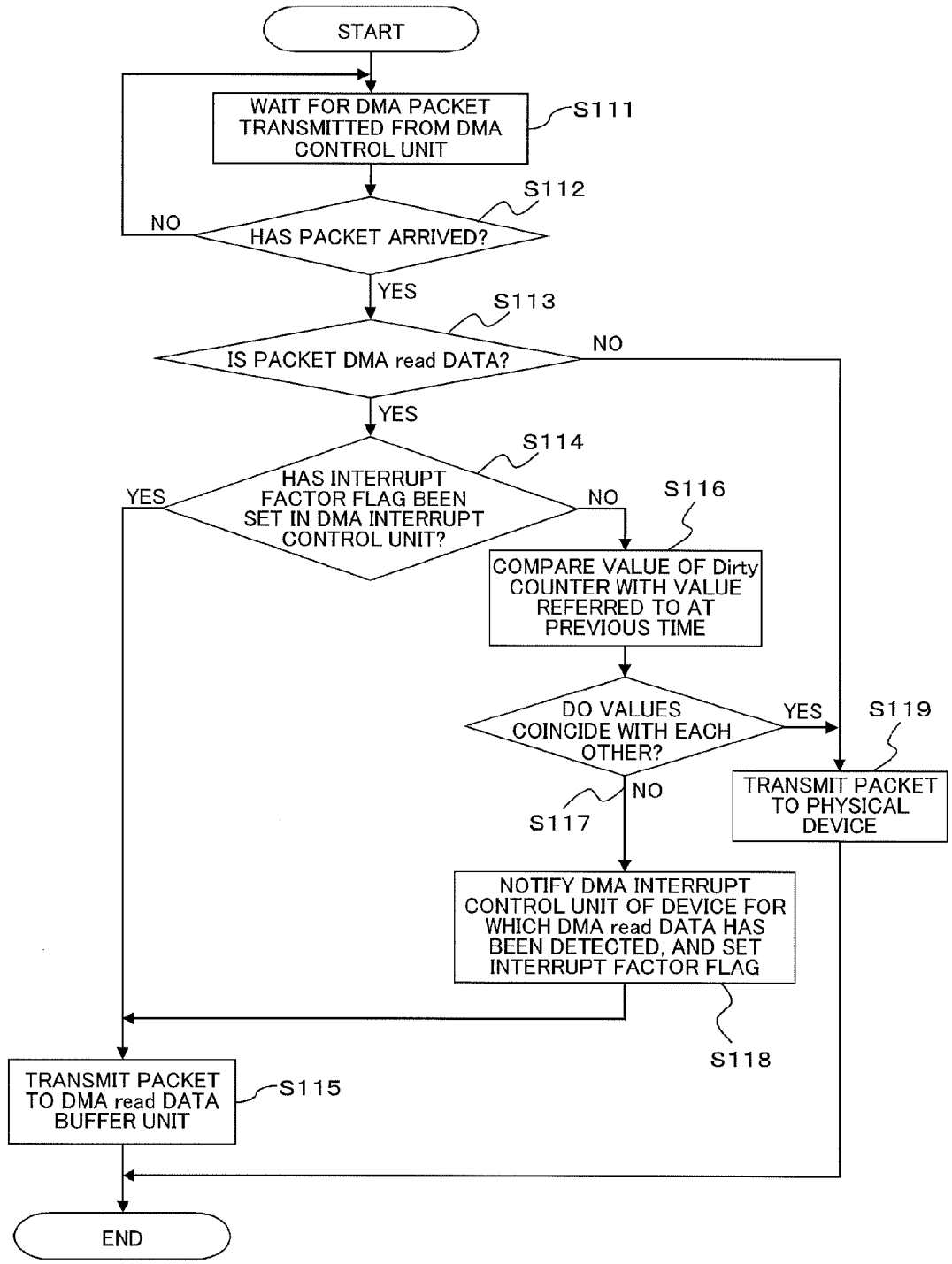
FIG. 6 is a flowchart that illustrates the process of a DMA read data monitoring unit of the FT server illustrated in FIG. 4.

Next, the process (operation) of the DMA read data monitoring unit 14 of the FT server 1 illustrated in FIG. 4 will be described along a flowchart (Steps S111 to S119) illustrated in FIG. 6. The process (operation) of the DMA read data monitoring unit 14 described here is performed in the above-described sequence 11.

The DMA read data monitoring unit 14 waits for a DMA packet transmitted from the DMA control unit 11 in Step S111. In a case where any DMA packet is not received (No route of Step S112), the process is returned to Step S111. On the other hand, in a case where a DMA packet is received (Yes route of Step S112), the DMA read data monitoring unit 14 determines whether or not the received DMA packet is DMA read data in Step S113.

In a case where the DMA packet is not DMA read data (No route of Step S113), the DMA read data monitoring unit 14 outputs the received DMA packet to the physical device 10c in Step S119, and the process ends.

On the other hand, in a case where the DMA packet is DMA read data (Yes route of Step S113), the DMA read data monitoring unit 14 determines whether or not the interrupt factor flag 16a according to the detection of the DMA read data is set in the DMA interrupt control unit 16 in Step S114. In a case where the interrupt factor flag 16a is set (Yes route of Step S114), the DMA read data monitoring unit 14 regards the FT control unit 21 to be in the middle of the synchronization process and transfers the received DMA packet, in other words, the DMA read data to the DMA read data buffering unit 15 so as to be stored therein in Step S115, and the process ends. Accordingly, the output of data from the physical device 10c to the outside is suppressed.

On the other hand, in a case where the interrupt factor flag 16a is not set (No route of Step S114), the DMA read data monitoring unit 14 regards the FT control unit 21 not to be in the middle of execution of the synchronization process. Then, in order to check whether or not the synchronization process needs to be performed, the DMA read data monitoring unit 14 refers to the dirty counter 17a and compares the current value of the dirty counter 17a with the value (the value stored in the storage area 17b) of the dirty counter 17a at the time of the previous reference in Step S116.

In a case where the current value of the dirty counter 17a and the value stored in the storage area 17b do not coincide with each other (No route of Step S117), the DMA read data monitoring unit 14 regards a memory difference for which the synchronization process performed by the FT control unit 21 is necessary to be present on the VM memory 10b. Then, the DMA read data monitoring unit 14 notifies the DMA interrupt control unit 16 of a device (a physical device 10c) from which the DMA read data has been detected and sets the interrupt factor flag 16a in Step S118. Accordingly, a DMA read data detection interrupt is generated from the DMA interrupt control unit 16 for the hypervisor 20, and the FT control unit 21 performs a synchronization process. In addition, after the completion of the comparison between the current value of the dirty counter 17a with the value stored in the storage area 17b, the DMA read data monitoring unit 14 instructs the memory access monitoring unit 17 to replace the value stored in the storage area 17b with the current value of the dirty counter 17a.

Thereafter, the DMA read data monitoring unit 14 transfers the received DMA packet, in other words, the DMA read data to the DMA read data buffering unit 15 so as to be stored therein in Step S115, and the process ends. Accordingly, the output of data from the physical device 10c to the outside is suppressed.

In a case where the current value of the dirty counter 17a and the value stored in the storage area 17b coincide with each other (Yes route of Step S117), the DMA read data monitoring unit 14 regards the primary side and the secondary side to be synchronized with each other. Then, the DMA read data monitoring unit 14 transfers the DMA read data to the physical device 10c without storing the DMA read data in the DMA read data buffering unit 15 in Step S119, and the process ends. Accordingly, the output of data from the physical device 10c to the outside is performed.

[2-2-5] Operation of DMA Interrupt Control Unit

Figure 7:
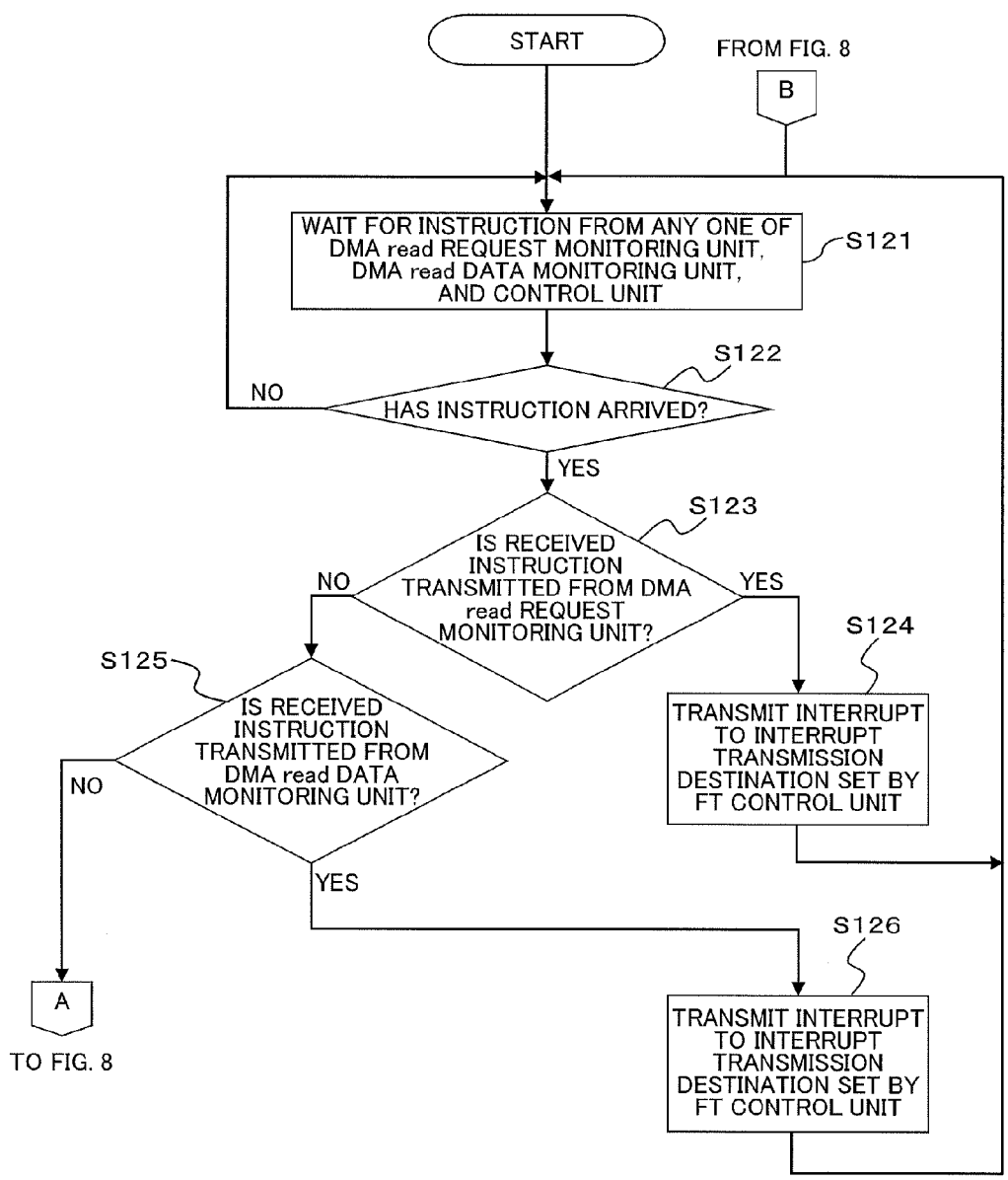
FIGS. 7 and 8 are flowcharts that illustrate the process of a DMA interrupt control unit of the FT server illustrated in FIG. 4.
Figure 8:
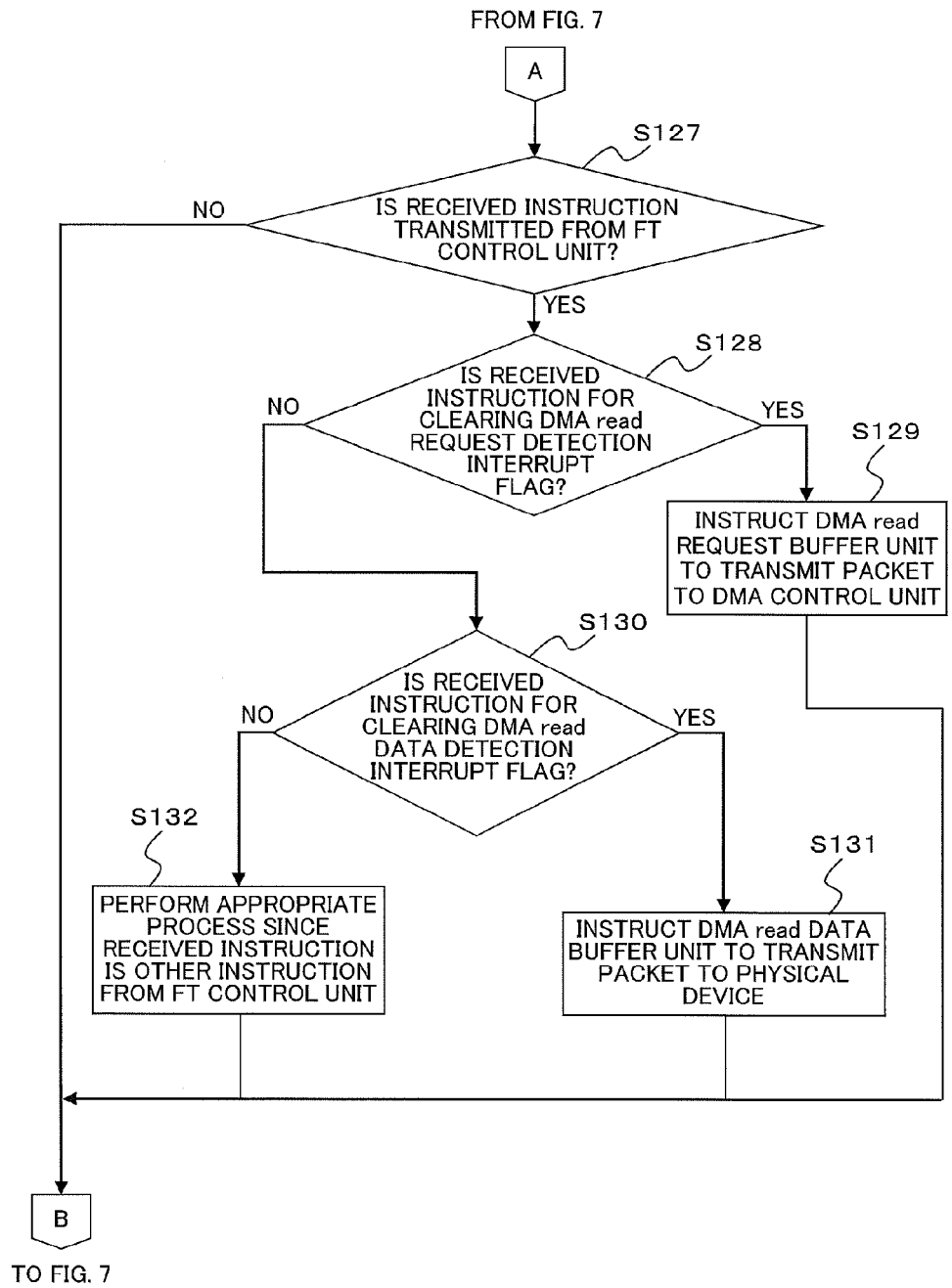

Next, the process (operation) of the DMA interrupt control unit 16 of the FT server 1 illustrated in FIG. 4 will be described along a flowchart (Steps S121 to S132) illustrated in FIGS. 7 and 8. The process (operation) of the DMA interrupt control unit 16 described here relates to Sequences 3, 4, 7, 8, and 11 to 14 described above.

The DMA interrupt control unit 16 waits for an instruction transmitted from any one of the DMA read request monitoring unit 12, the DMA read data monitoring unit 14, and the FT control unit 21 in Step S121. In a case where an instruction is not received (No route of Step S122), the process is returned to Step S121. On the other hand, in a case where an instruction has been received (Yes route of Step S122), the DMA interrupt control unit 16 determines whether or not the received instruction is an instruction transmitted from the DMA read request monitoring unit 12 in Step S123.

In a case where the received instruction is an instruction transmitted from the DMA read request monitoring unit 12 (Yes route of Step S123), the DMA interrupt control unit 16 transmits a DMA read request detection interrupt to an interrupt transmission destination set in advance by the FT control unit 21 in Step S124, and the process is returned to Step S121.

On the other hand, in a case where the received instruction is not an instruction transmitted from the DMA read request monitoring unit 12 (No route of Step S123), the DMA interrupt control unit 16 determines whether or not the received instruction is an instruction transmitted from the DMA read data monitoring unit 14 in Step S125.

In a case where the received instruction is an instruction transmitted from the DMA read data monitoring unit 14 (Yes route of Step S125), the DMA interrupt control unit 16 transmits a DMA read data detection interrupt to an interrupt transmission destination set in advance by the FT control unit 21 in Step S126, and the process is returned to Step S121.

On the other hand, in a case where the received instruction is not an instruction transmitted from the DMA read data monitoring unit 14 (No route of Step S125), the DMA interrupt control unit 16 determines whether or not the received instruction is an instruction transmitted from the FT control unit 21 in Step S127.

In a case where the received instruction is not an instruction transmitted from the FT control unit 21 (No route of Step S127), the DMA interrupt control unit 16 returns the process to Step S121. On the other hand, in a case where the received instruction is an instruction from the FT control unit 21 (Yes route of Step S127), the DMA interrupt control unit 16 determines whether or not the received instruction is an instruction (see Sequences 7 and 8 described above) for clearing the DMA read request detection interrupt flag 16a in Step S128.

In a case where the received instruction is the instruction for clearing the DMA read request detection interrupt flag 16a (Yes route of Step S128), the DMA interrupt control unit 16 instructs the DMA read request buffering unit 13 to transmit a packet (DMA read request) to the DMA control unit 11 in Step S129 (see Sequence 8 described above). Thereafter, the DMA interrupt control unit 16 returns the process to Step S121.

On the other hand, in a case where the received instruction is not the instruction for clearing the DMA read request detection interrupt flag 16a (No route of Step S128), the DMA interrupt control unit 16 determines whether or not the received instruction is an instruction for clearing the DMA read data detection interrupt flag 16a (see Sequence 14 described above) in Step S130.

In a case where the received instruction is the instruction for clearing the DMA read data detection interrupt flag 16a (Yes route of Step S130), the DMA interrupt control unit 16 instructs the DMA read data buffering unit 15 to transmit a packet (DMA read request) to the physical device 10c in Step S131 (see Sequence 14 described above). Thereafter, the DMA interrupt control unit 16 returns the process to Step S121.

On the other hand, in a case where the received instruction is not the instruction for clearing the DMA read data detection interrupt flag 16a (No route of Step S130), the received instruction is another instruction transmitted from the FT control unit 21, and accordingly, the DMA interrupt control unit 16 performs a process that is appropriate to the instruction in Step S132. Thereafter, the DMA interrupt control unit 16 returns the process to Step S121.

[2-3] Advantage of FT Server According to First Embodiment

In this way, according to the FT server 1 of the first embodiment, the following operations and advantages (g1) to (g6) can be acquired.

(g1) The output of data to the outside can be detected without emulating the physical device 10c as a virtual device using the hypervisor 20. Accordingly, the hypervisor 20 does not need to emulate the physical device 10c as a virtual device, and the physical device driver 41 provided inside the VM 40 that is provided by the hypervisor 20 can directly operate the physical device 10c, whereby the performance of the output of data to the outside is improved. Accordingly, the input/output access performance of the VM is improved.

(g2) At that time, in a case where the hypervisor 20 is in the middle of execution of the synchronization process in accordance with the detection of the output of data to the outside, the output of data to the outside is suppressed. Accordingly, it can be reliably prevented that data is output to the outside during the synchronization process to break down the synchronization state between the primary side and the secondary side.

(g3) Since the function for monitoring a DMA to the VM 40, which is provided by the hypervisor 20, from the physical device 10c and recording the DMA in the VM memory management table 22 is provided, information of the memory 10b for the synchronization process can be reliably acquired by the hypervisor 20.

(g4) A device that is not widely used or a device of a latest technology can be used by the OS inside the VM 40 without generating an emulation function corresponding to the physical device 10c used by the FT server 1. Accordingly, in the FT server 1 using the hypervisor 20, physical devices of the same kind as the kind of the physical devices used in an ordinary server can be easily handled.

(g5) The FT server 1 can be applied also to the configuration in which the physical device 10c is included inside the CPU subsystem 10A. In other words, the FT server 1 can be applied also to a configuration employing a CPU that is formed as the SoC, and accordingly, the FT server 1 having high performance can be realized.

(g6) In this embodiment, a unit is included which does not notify the hypervisor of the output of data to the outside when a synchronization process is not necessary. In other words, in this embodiment, in a case where the current value of the dirty counter 17a and the value stored in the storage area 17b coincide with each other, the primary side and the secondary side are regarded to be synchronized with each other, and the synchronization process performed by the FT control unit 21 is avoided. Accordingly, an unnecessary synchronization process is suppressed, and the performance of the entire FT server 1 is improved.

[3] FT Server According to Second Embodiment

Hereinafter, an FT server (information processing apparatus) 1' according to a second embodiment will be described with reference to FIGS. 9 to 20.

[3-1] Configuration of FT Server According to Second Embodiment

First, the configuration of the FT server 1' according to the second embodiment will be described with reference to FIG. 9. FIG. 9 is a block diagram that illustrates the hardware configuration and the functional configuration of the FT server 1' according to the second embodiment. Here, the same reference numeral as that described above denotes the same part or an almost same part.

In the FT server 1' according to the second embodiment illustrated in FIG. 9, similar to the FT server 1 of the first embodiment illustrated in FIG. 4, two sets of hardware 10' and 10' having the same configuration are interconnected through an interconnect 50 such as Ethernet. Here, also in the second embodiment, one set of the hardware 10' will be referred to as primary and the other set of the hardware 10' will be referred to as secondary. In each of the primary and the secondary, a hypervisor 20 is built, and management VMs 30 and 40 are built by the hypervisor 20. Hereinafter, while the function, the configuration, and the operation of the primary side will be described, the function, the configuration, and the operation of the secondary side are similar to those of the primary side, and thus, the description and the illustration thereof will not be presented.

Also in the second embodiment, the VM 40 is a protection target, in other words, a fault-tolerant target, and, inside the OS on the VM 40, a driver 42 that controls a PCIe device 10e as a physical device (I/O device) is included, and the VM 40 can directly control the PCIe device 10*e*. In addition, in the hypervisor 20, similar to the first embodiment, an FT control unit 21 that performs control of the FT for the VM 40 as a target and a VM memory management table 22 that manages the VM memory space (memory 10*b*) are included.

In the hardware 10', a CPU subsystem 10B that is configured by a CPU and a memory is included. The CPU subsystem 10B includes a CPU core 10*a*, a memory, a memory controller 10*b*, a PCIe root complex 10*d*, two PCIe devices 10*e* and 10*f* as physical devices, and a memory access monitoring unit 17 as constituent elements. The FT server 1' according to the second embodiment is applied to a configuration that employs a CPU configured as the SoC. In addition, the PCIe root complex 10*d* includes: a DMA control unit 11; a DMA read request monitoring unit 12; a DMA read request buffering unit 13; a DMA read data monitoring unit 14; a DMA read data buffering unit 15; and a DMA interrupt control unit 16 as constituent elements.

Hereinafter, each constituent element will be described. Here, while the number of constituent elements is not particularly defined, one or more of the constituent elements are provided.

The PCIe root complex 10*d* is a component that is defined in the PCIe specification and is a component (interface) connecting the CPU core 10*a* and the memory controller 10*b* and the PCIe devices 10*e* and 10*f* together.

The DMA control unit 11 controls a DMA that is performed between the PCIe device 10*e* and the memory 10*b* provided inside the CPU subsystem 10B and includes a DMA write monitoring unit 11*a* and a DMA remapping function 11*b*. More specifically, the DMA control unit 11 performs a process of converting a PCIe transaction packet received from the PCIe device 10*e* side into a memory access command for the memory controller 10*b* and a process of converting a memory access command received from the memory controller side into a PCIe transaction packet for the PCIe device 10*e*. At this time, a designated address of the PCIe device 10*e* side is converted into an address of the memory controller 10*b* side based on the DMA remapping function 11*b*. Such a DMA remapping function 11*b*, for example, is built in a CPU of the Xeon E5 series of Intel Corp. and the like. The DMA remapping function 11*b*, similar to the DMA remapping function 170 described above with reference to FIG. 3 (see the processing sequences (d1) to (d4) described above), is a function for enabling the physical device driver 41 provided inside the OS on the VM 40 to directly control the physical device 10*c*.

The DMA write monitoring unit (monitoring unit) 11*a* achieves the function of the above-described unit (e4) and monitors a memory write request transaction (MWr; recording from the PCIe device 10*e* into the memory 10*b*) and records the occurrence of a change in the content of the memory 10*b* in the VM memory management table 22. More specifically, in a case where a memory write request transaction (MWr) that is a write access relating to data writing from the PCIe device 10*e* into the memory 10*b* is detected, the DMA write monitoring unit 11*a* records the occurrence of a change in data corresponding to an address relating to the data writing in the VM memory management table 22. The DMA write monitoring unit 11*a* according to the second embodiment achieves the same function as that of the DMA write monitoring unit 11*a* according to the first embodiment, and thus, detailed description thereof will not be presented.

The DMA read request monitoring unit (monitoring unit) 12 achieves the functions of the above-described units (e1) and (e5). The DMA read request monitoring unit 12 monitors a PCIe transaction packet that is transmitted from the PCIe device 10*e* to the PCIe root complex 10*d*. When a memory read request transaction (MRd; a read request from the PCIe device 10*e* into the PCIe root complex 10*d*) is detected, the DMA read request monitoring unit 12 compares the count value of the counter 17*a*, which has been referred to at the time of performing the previous synchronization process, stored in the storage area 17*b* with the current value of the dirty counter 17*a*. In a case where the current value of the counter 17*a* and the count value stored in the storage area 17*b* do not coincide with each other, the DMA read request monitoring unit 12 determines a state in which a change in the data of the memory 10*b* has been performed, and the primary side and the secondary side are not synchronized with each other. Then, the DMA read request monitoring unit 12 suppresses the output of data to the outside by storing the memory read request transaction (MRd) in the DMA read request buffering unit 13. In addition, the DMA read request monitoring unit 12 notifies the hypervisor 20 of the detection of the memory read request transaction (MRd) through the DMA interrupt control unit 16 as a memory read request interrupt, so that the FT control unit 21 can perform the synchronization process. On the other hand, in a case where the current value of the counter 17*a* and the count value stored in the storage area 17*b* coincide with each other, the DMA read request monitoring unit 12 determines a state in which the primary side and the secondary side are synchronized with each other. Then, the DMA read request monitoring unit 12 outputs data to the outside without storing the memory read request transaction (MRd) in the DMA read request buffering unit 13. In addition, the DMA read request monitoring unit 12, as will be described later, also has a function for monitoring and detecting a memory write request packet for transferring data from the PCIe device 10*e* to the memory 10*b*.

The DMA read request buffering unit (a suppression unit, a buffer) 13 achieves the function of the above-described unit (e3) and is a buffer that stores a memory read request transaction (MRd) transmitted from the PCIe device 10*e* to the PCIe root complex 10*d*. In other words, in a case where the hypervisor 20 is in the middle of execution of the synchronization process when a notification of the memory read request interrupt is received from the DMA interrupt control unit 16, the DMA read request buffering unit 13 suppresses the output of data to the outside by temporarily maintaining the memory read request transaction (MRd). Then, the DMA read request buffering unit 13 transfers the maintained memory read request transaction (MRd) to the DMA control unit 11 (the memory 10*b* side) in accordance with an instruction from the DMA interrupt control unit 16 accompanied with the end of the synchronization process that is performed by the FT control unit 21.

The DMA read data monitoring unit (monitoring unit) 14 achieves the functions of the above-described units (e1) and (e5). The DMA read data monitoring unit 14 monitors a PCIe transaction packet transmitted from the memory controller (memory) 10*b* to the PCIe device 10*e*. When a completion with data transaction (CplD; read target data for data output from the memory 10*b* to the PCIe device 10*e*) is detected, the DMA read data monitoring unit 14 compares the count value of the counter 17*a*, which has been referred to at the time of performing the previous synchronization process, with the current value of the dirty counter 17*a*. In a case where the current value of the counter 17*a* and the count value stored in the storage area 17*b* do not coincide with each other, the DMA read data monitoring unit 14 determines a state in which a change in the data of the memory 10b has been made, and the primary side and the secondary side are not synchronized with each other. Then, the DMA read data monitoring unit 14 suppresses the output of data to the outside by storing the completion with data transaction (CplD) in the DMA read data buffering unit 15. In addition, the DMA read data monitoring unit 14 notifies the hypervisor 20 of the detection of the completion with data transaction (CplD) as a completion with data interrupt through the DMA interrupt control unit 16, so that the FT control unit 21 is caused to perform a synchronization process. On the other hand, in a case where the current value of the counter 17a and the count value stored in the storage area 17b coincide with each other, the DMA read data monitoring unit 14 determines a state in which the primary side and the secondary side are synchronized with each other. Then, the DMA read data monitoring unit 14 outputs data to the outside without storing the completion with data transaction (CplD) in the DMA read data buffering unit 15.

The DMA read data buffering unit (a suppression unit, a buffer) 15 achieves the function of the above-described unit (e3) and is a buffer that stores a completion with data transaction (CplD) transmitted from the memory controller (memory) 10b to the PCIe device 10e. In other words, in a case where the hypervisor 20 is in the middle of execution of the synchronization process when a notification of the completion with data interrupt is received from the DMA interrupt control unit 16, the DMA read data buffering unit 15 suppresses the output of data to the outside by temporarily maintaining the completion with data transaction (CplD). Then, the DMA read data buffering unit 15 transfers the maintained completion with data transaction (CplD) to the PCIe device 10e in accordance with an instruction from the DMA interrupt control unit 16 accompanied with the end of the synchronization process that is performed by the FT control unit 21.

The DMA interrupt control unit (notification unit) 16 achieves the function of the above-described unit (e2). The DMA interrupt control unit 16 generates an interrupt (VMexit in the case of the Intel CPU) for notifying the hypervisor 20 of the detection of a memory read request transaction (MRd). In addition, the DMA interrupt control unit 16 generates an interrupt (VMexit in the case of an Intel CPU) for notifying the hypervisor 20 of the detection of a completion with data transaction (CplD). In other words, in a case where the monitoring unit 12 or 14 detects a memory read request transaction (MRd) or a completion with data transaction (CplD), the DMA interrupt control unit 16 determines that a read access outputting data to the outside has been detected and notifies the hypervisor 20 of the detection of the read access as a "memory read request interrupt" or a "completion with data interrupt".

In addition, the DMA interrupt control unit 16 has the interrupt factor flag 16a and the monitoring target PCIe device management table 16b. The interrupt factor flag 16a is set in a case where the monitoring unit 12 or 14 causes the DMA interrupt control unit 16 to generate an interrupt so that the FT control unit 21 performs a synchronization process. On the other hand, when the FT control unit 21 ends the synchronization process, the interrupt factor flag 16a is cleared. When the interrupt factor flag 16a is cleared, the DMA interrupt control unit 16 instructs the buffering units 13 and 15 to transfer memory read request transaction (MRd) or the completion with data transaction (CplD) that is maintained. The monitoring units 12 and 14 determine that the FT control unit 21 is in the middle of execution of the synchronization process in a case where the interrupt factor flag 16a is set and determines that the FT control unit 21 is not in the middle of execution of the synchronization process in a case where the interrupt factor flag 16a is not set (cleared state). The monitoring target PCIe device management table 16b will be described later with reference to FIGS. 15A to 15C.

The memory access monitoring unit 17, similar to the memory access monitoring unit 17 according to the first embodiment, monitors an access to the memory 10b of the CPU (CPU core 10a) and, when the content of the memory 10b is changed, records the occurrence of the change in the content of the memory 10b in the VM memory management table 22. In addition, the memory access monitoring unit 17 according to the second embodiment includes a dirty counter 17a and a storage area 17b. Since the memory access monitoring unit 17, the dirty counter 17a, and the storage area 17b according to the second embodiment achieve the same functions as those of the memory access monitoring unit 17, the dirty counter 17a, and the storage area 17b according to the first embodiment, detailed description thereof will not be presented.

The PCIe device 10e is a physical device that has a function for exchanging data with the outside of the system such as Ethernet or a fiber channel. The PCIe device 10e may be built in the CPU subsystem, or may be present outside the CPU subsystem and be connected to the CPU subsystem through a PCIe link. In the second embodiment, as illustrated in FIG. 9, a case will be described in which the PCIe device 10e is built in the CPU subsystem 10B. The PCIe device 10e is configured to be accessible from the driver 42 of the PCIe device 10e on the VM 40 in accordance with the DMA remapping function 11b.

A PCIe device 10f is a physical device having a function for enabling communication between the primary side and the secondary side and is connected to an interconnect 50 such as Ethernet or InfiniBand. The PCIe device 10f may be built in the CPU subsystem, or may be present outside the CPU subsystem and be connected to the CPU subsystem through a PCIe link. In the second embodiment, as illustrated in FIG. 9, a case will be described in which the PCIe device 10f is built in the CPU subsystem 10B.

The hypervisor 20 builds and manages the management VM 30 and the VM 40 and, as described above, includes an FT control unit 21 and a VM memory management table 22.

The VM memory management table 22 is a table used for managing the memory allocated to the VM 40. As the VM memory management table 22, for example, an extended page table of Intel Corp. is used. The VM memory management table 22 maintains correspondence information between the physical memory address of the VM 40 and the physical address of the system. In addition, the VM memory management table 22 maintains information of the memory to which a write access from the CPU (CPU core 10a) has been made. The detailed configuration of the VM memory management table 22 will be described later with reference to FIG. 20.

The FT control unit 21, similar to the FT control unit 21 according to the first embodiment, in order to realize the fault-tolerant function, performs the following "synchronization process". The FT control unit 21 transmits the context of the CPU of the VM 40 and the content of the memory of the VM to the secondary side using the PCIe device 10f by being triggered upon an interrupt (for example, VMexit) transmitted from the DMA interrupt control unit 16. An interrupt factor that becomes the trigger is detection of a memory read request transaction (MRd) from the PCIe device 10e to the PCIe root complex 10d or detection of a completion with data transaction (CplD) from the PCIe root complex 10d to the PCIe device 10e. The context of the CPU of the VM 40, for example, is saved on the memory 10b by the CPU in the case of VMexit. In addition, the content of the memory of the VM 40 that is transmitted from the primary side to the secondary side is only a changed portion of the content of the memory of the VM 40 until a memory change portion is transmitted this time after the memory change portion of the VM 40 has been transmitted. Accordingly, the transmission time for the synchronization process can be shortened. In order to transmit only a changed portion of the content of the memory of the VM 40 as described above, the FT control unit 21 searches the VM memory management table 22 and transmits a memory change portion (data corresponding to an address at which "1" is set in the dirty bit) at which a write access has been made from the CPU to the secondary side. When the memory change portion is transmitted to the secondary side, the FT control unit 21 clears the dirty bit that is set at the address corresponding to the memory change portion in the VM memory management table 22 to be "0". By using such a dirty bit, when a memory change portion is transmitted to the secondary side next time, the FT control unit 21 can reliably detect a difference from this time.

As described above, the VM 40 is a virtual machine that is built by the hypervisor 20. The OS operating inside the VM 40 exchanges data with the outside using the PCIe device 10e through the driver 42 of the PCIe device 10e.

[3-2] Operation of FT Server According to Second Embodiment

Next, the operation of the above-described FT server 1' according to the second embodiment will be described with reference to FIGS. 10 to 20.

[3-2-1] PCIe Transaction

First, the operation of the FT server 1' illustrated in FIG. 9 will be described with reference to FIGS. 12 and 13 along reference numerals (1) to (9) illustrated in FIG. 10 and a flowchart (Steps S201 to S209) illustrated in FIG. 11. In description presented below, the sequences of items (1) to (9) correspond to reference numerals (1) to (9) illustrated in FIG. 10. In addition, Steps S201 to S209 illustrated in FIG. 11 respectively correspond to the sequences of items (1) to (9).

Figure 10:
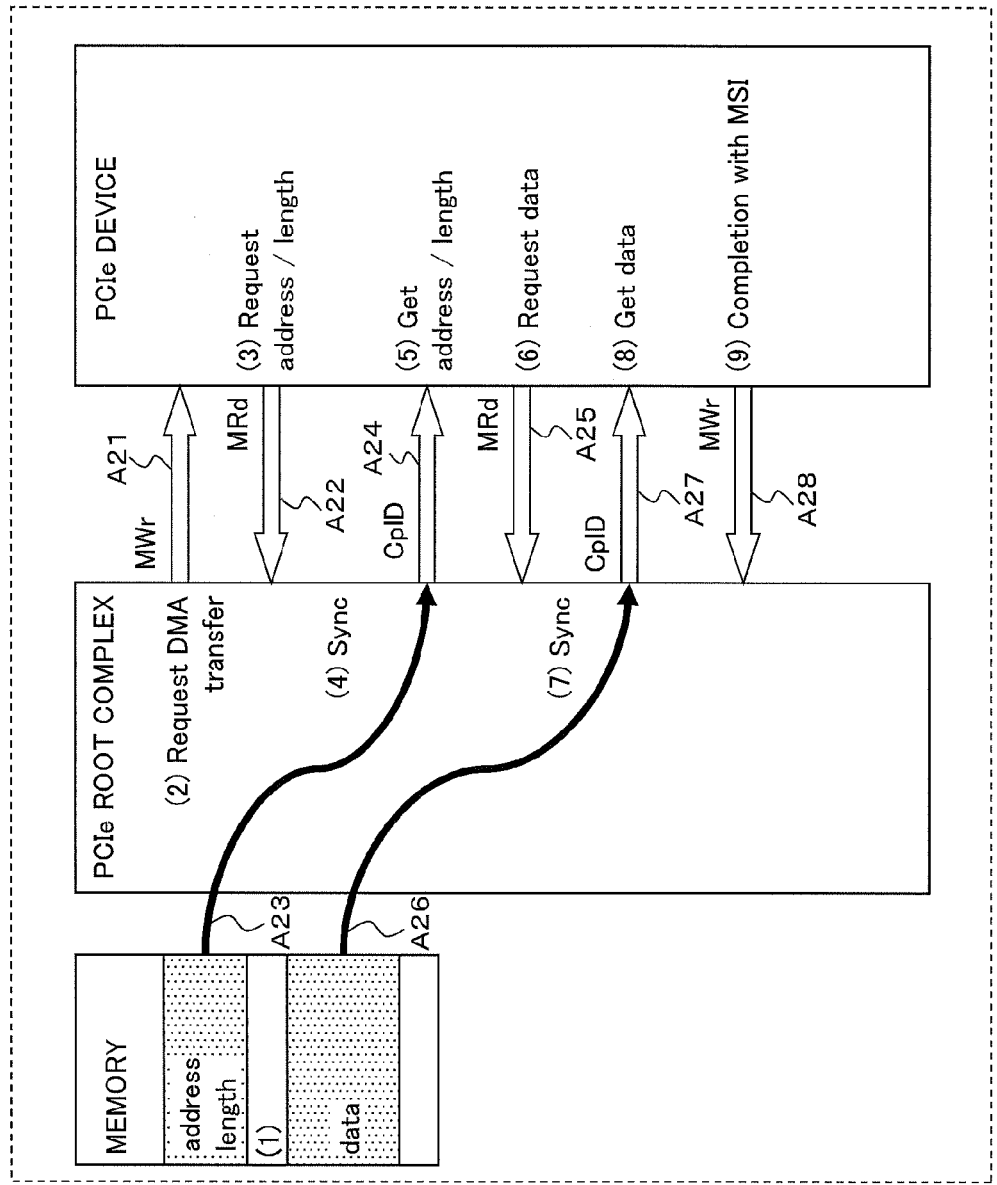
FIG. 10 is a diagram that illustrates an example of peripheral components interconnect express (PCIe) transaction in the FT server illustrated in FIG. 9.

FIG. 10 is a diagram that illustrates an example of a PCIe transaction in the FT server 1' illustrated in FIG. 9 with a PCIe transaction at the time of transmitting data from this system to the outside through the PCIe device 10e focused on. FIG. 11 is a flowchart that illustrates an overview of a data transmission process for the outside of the system in the FT server 1' illustrated in FIG. 9. FIG. 12 is a diagram that illustrates an example of a memory map at the time of transferring data in the FT server 1' illustrated in FIG. 9. FIG. 13 is a diagram that illustrates an example of memory mapping between a VM address and a physical address in the FT server 1' illustrated in FIG. 9.

Figure 11:
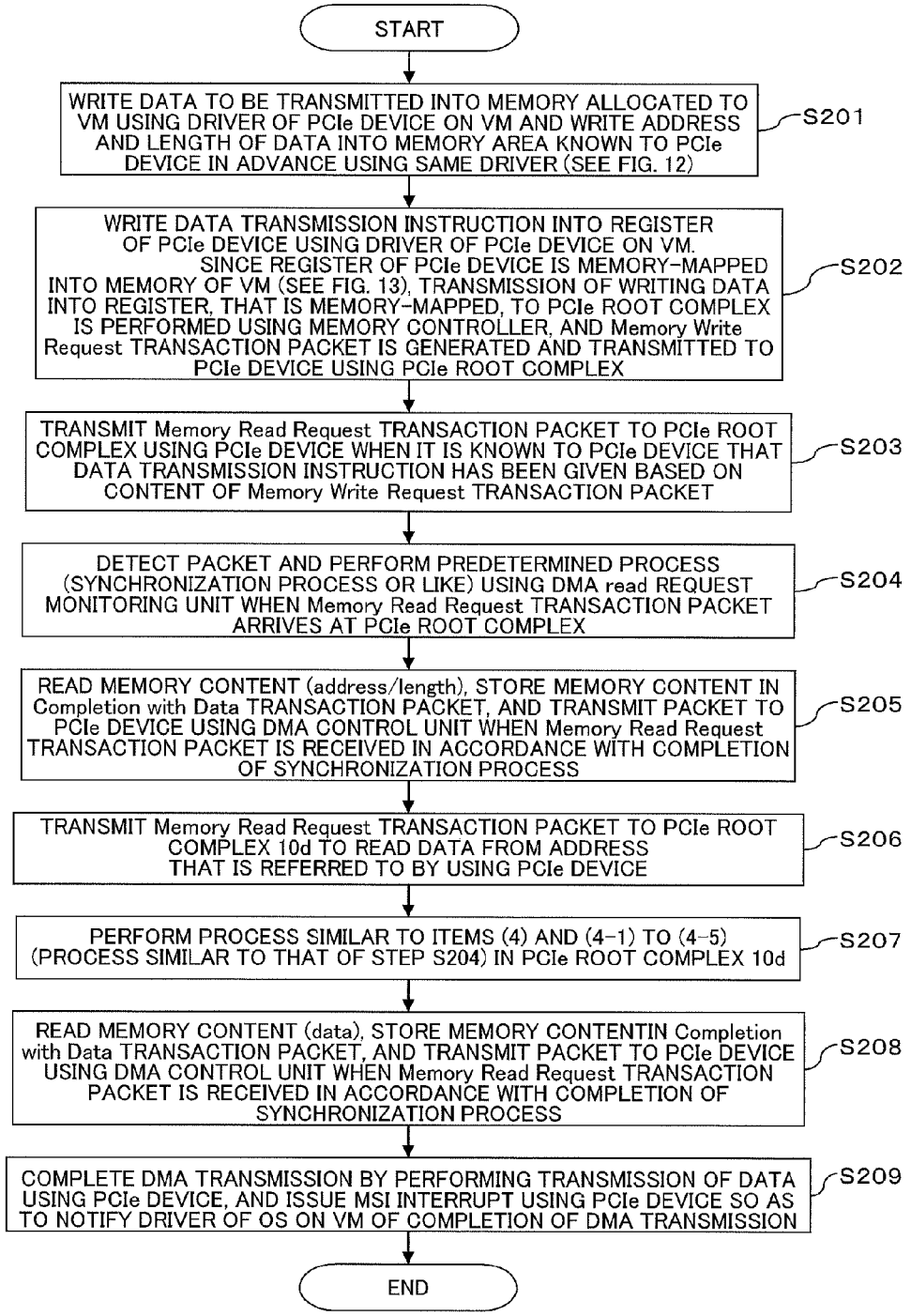
FIG. 11 is a flowchart that illustrates an overview of a data transmission process for the outside of the system in the FT server illustrated in FIG. 9.
Figure 12:
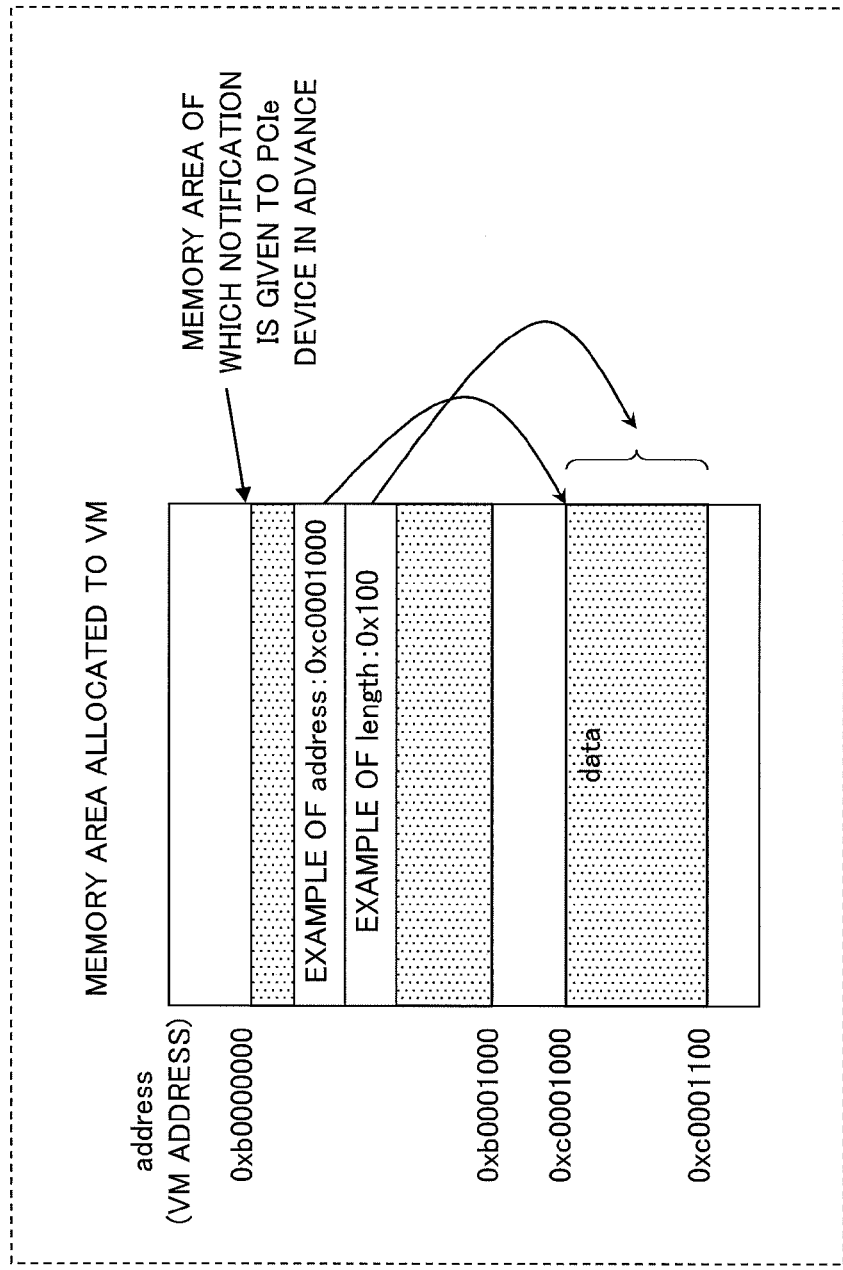
FIG. 12 is a diagram that illustrates an example of a memory map at the time of transferring data in the FT server illustrated in FIG. 9.

(1) In order to transfer data to the outside, the driver 42 of the PCIe device 10e on the VM 40, as illustrated in FIG. 12, writes data desired to be transferred on the memory allocated to the VM 40. In addition, the driver 42 writes the address and the length of the data on the memory of the VM 40 into an area of the memory of the VM 40 (see (1) illustrated in FIG. 10 and Step S201 illustrated in FIG. 11). The PCIe device 10e is notified in advance of the address of the memory area at which the address and the length are written by the driver 42 of the PCIe device 10e.

(2) In order to instruct the transfer of data to the PCIe device 10e, the driver 42 of the PCIe device 10e on the VM 40 writes a data transfer instruction (data transmission instruction) into the register of the PCIe device 10e. Since the register of the PCIe device 10e, as illustrated in FIG. 13, is mapped into the memory of the VM 40, the recording in the memory-mapped register is transmitted to the PCIe root complex 10d by the memory controller 10b. Then, the PCIe root complex 10d generates a memory write request transaction packet (MWr) in accordance with the recording in the register and transmits the generated memory write request transaction packet to the PCIe device 10e (see (2) Request DMA transfer illustrated in FIG. 10, arrow A21 illustrated in FIG. 10, and Step S202 illustrated in FIG. 11).

(3) The PCIe device 10e is aware of the given data transfer instruction based on the content of the memory write request transaction packet. In accordance with this data transfer instruction, the PCIe device 10e transmits the memory read request transaction packet (MRd) to the PCIe root complex 10d (see (3) Request address/length illustrated in FIG. 10, arrow A22 illustrated in FIG. 10, and Step S203 illustrated in FIG. 11). Here, the content of the packet transmitted to the PCIe root complex 10d is an instruction for acquiring address/length information.

(4) When the memory read request transaction packet arrives at the PCIe root complex 10d, the DMA read request monitoring unit 12 detects a memory read request transaction packet, and the process of the following items (4-1) to (4-5) is performed (see (4) Sync illustrated in FIG. 10 and Step S204 illustrated in FIG. 11).

(4-1) The DMA read request monitoring unit 12 monitors a PCIe transaction packet that arrives at the PCIe root complex 10d. In a case where the arrived packet is a packet transmitted from the PCIe device (for example, the PCIe device 10f illustrated in FIG. 9) that is not allocated to the VM 40, the DMA read request monitoring unit 12 transmits the packet only to the DMA control unit 11. This transmission process corresponds to the process of "No route" of Step S213 illustrated in FIG. 14 to Step S219 to be described later. A PCIe device from which the PCIe transaction packet has been transmitted can be determined by referring to the header of the packet. The determination method is within the range of the PCI-Express specification.

(4-2) The DMA read request monitoring unit 12 that has detected the memory read request transaction packet (MRd) from the PCIe device 10e, in order to determine whether or not the FT control unit 21 is in the middle of execution of the synchronization process, checks whether or not the factor flag 16a of the memory read request interrupt or the completion with data interrupt is set in the DMA interrupt control unit 16. In a case where the interrupt factor flag is set, the FT control unit 21 can be regarded to be in the middle of execution of the synchronization process, and accordingly, the DMA read request monitoring unit 12 transmits the detected memory read request transaction packet to the DMA read request buffering unit 13. The DMA read request buffering unit 13 puts the transmitted packet into a first-in first-out (FIFO) buffer. Accordingly, the output of data from the PCIe device 10e to the outside is suppressed.

(4-3) In a case where the interrupt factor flag 16a is not set in the DMA interrupt control unit 16, the DMA read request monitoring unit 12 regards the FT control unit 21 not to be in the middle of the synchronization process. Here, the DMA read request monitoring unit 12 refers to the current value (current count value) of the dirty counter 17a. In addition, in the storage area 17b, the count value at the time of the previous reference of the dirty counter 17a is stored. The DMA read request monitoring unit 12 compares the current value of the dirty counter 17a with the value (the value stored in the storage area 17b) of the dirty counter 17a at the time of the previous reference. In a case where the current value of the dirty counter 17a and the value stored in the storage area 17b are different from each other, it can be regarded that a memory difference for which the synchronization process performed by the FT control unit 21 is necessary is present on the VM memory 10b. Thus, the DMA read request monitoring unit 12, in order to cause the FT control unit 21 to perform the synchronization process, causes the DMA interrupt control unit 16 to generate an interrupt (VMexit) caused by the detection of the memory read request transaction packet. At this time, the interrupt factor flag 16a of the DMA interrupt control unit 16 is set.

(4-4) The FT control unit 21 that has detected the interrupt generated in item (4-3) described above performs the synchronization process. The FT control unit 21 that has completed the synchronization process clears the interrupt factor flag 16a and moves the process to the VM 40. When the interrupt factor flag 16a is cleared, the DMA interrupt control unit 16 instructs the DMA read request buffering unit 13 to transmit a memory read request transaction packet to the DMA control unit 11. The DMA read request buffering unit 13 that has received this instruction transmits all the stored memory read request transaction packets to the DMA control unit 11. Here, since the synchronization process of the FT control unit 21 is performed similar to Sequences 5 and 6 according to the first embodiment, the description thereof will not be presented.

(4-5) In a case where the interrupt factor flag 16a is not set in the DMA interrupt control unit 16, and the current value of the dirty counter 17a and the value stored in the storage area 17b are the same, the primary side and the secondary side are synchronized with each other, and there is no memory difference for which the synchronization process is to be performed. Accordingly, the DMA read request monitoring unit 12 transmits a memory read request transaction packet to the DMA control unit 11. This transmission process corresponds to the process of "Yes route" of Step S217 illustrated in FIG. 14 to Step S219. By performing the process described above, unnecessary interrupts can be reduced, and accordingly, the process of the whole system is performed at high speed.

(5) When the memory read request transaction packet is received, the DMA control unit 11 converts the content of the packet into an instruction for the memory controller 10b using the DMA remapping function 11b and reads the content (here, the address/length) of the memory (see arrow A23 illustrated in FIG. 10). Then, the DMA control unit 11 stores the content read from the memory 10b in the completion with data transaction packet (CplD) and transmits the read content to the PCIe device 10e (see arrow A24/(5) Get address/length illustrated in FIG. 10 and Step S205 illustrated in FIG. 11).

(6) The PCIe device 10e that has acquired the completion with data transaction packet refers to the address/length stored in the packet. Then, the PCIe device 10e transmits the memory read request transaction packet (MRd) to the PCIe root complex 10d so as to read data from the address that has been referred to (see (6) Request data/arrow A25 illustrated in FIG. 10 and Step S206 illustrated in FIG. 11). When the length of the data is long, a plurality of memory read request transaction packets may be transmitted.

(7) In the PCIe root complex 10d that has received the memory read request transaction packet, the process similar to the above-described items (4) and (4-1) to (4-5) is performed (see (7) Sync illustrated in FIG. 10 and Step S207 illustrated in FIG. 11). In addition, the process of the item (7) is performed after the synchronization process is performed in the process of the above-described items (4) and (4-1) to (4-5), and accordingly, there are many cases where there is no memory difference for which the synchronization process needs to be performed.

(8) When the memory read request transaction packet is received, the DMA control unit 11 converts the content of the packet into an instruction for the memory controller 10b by using the DMA remapping function 11b and reads the content (here, data) of the memory (see arrow A26 illustrated in FIG. 10). Then, the DMA control unit 11 stores the content read from the memory 10b in the completion with data transaction packet (CplD) and transmits the content to the PCIe device 10e (see arrow A27/(8) Get data illustrated in FIG. 10 and Step S208 illustrated in FIG. 11).

(9) The PCIe device 10e that has received data using the completion with data transaction packet receives data to be transferred and transfers the data, thereby completing the DMA transfer. Then, in order to notify the driver 42 of the OS on the VM 40 of the completion of the DMA transfer, the PCIe device issues an MSI interrupt defined in the PCI-Express specification (see arrow A28/(9) Completion with MSI illustrated in FIG. 10 and Step S209 illustrated in FIG. 11). More specifically, the MSI interrupt is a memory write request transaction packet (MWr).

[3-2-2] Next, in the FT server 1' illustrated in FIG. 9, when data is transferred from the PCIe device 10e to the memory of the VM 40, an operation (Sequences (11) to (14) described below), which is performed by the FT control unit 21, of acquiring data transferred using the DMA transfer as a memory difference will be described. Sequences (11) to (14) described below respectively correspond to Sequences 21 to 24 described in the first embodiment.

(11) In order to write data at a memory address of the VM 40, the PCIe device 10e transmits a memory write request transaction packet (MWr).

(12) The DMA read request monitoring unit 12 transmits the memory write request transaction packet (DMA write request) to the DMA control unit 11.

(13) The DMA remapping function 11b of the DMA control unit 11 refers to the conversion table between the VM memory address and the physical address, which is prepared in advance by the FT control unit 21 of the hypervisor 20, and performs conversion of the address included inside the memory write request transaction packet. In other words, the DMA remapping function 11b converts the physical address included inside the memory write request transaction packet into a VM memory address.

(14) The DMA write monitoring unit 11a refers to the VM memory management table 22 of the hypervisor 20 and sets "1" to a dirty bit (change bit; see FIG. 20) corresponding to the address included inside the memory write request transaction packet in the table 22. Accordingly, the occurrence of a change in the data corresponding to the address included inside the memory write request transaction packet is recorded in the VM memory management table 22. Thereafter, the DMA write monitoring unit 11a transmits a memory access request to the memory controller (memory) 10b.

According to Sequences (11) to (14) described above, the occurrence of a change in the memory is recorded in the VM memory management table 22, and accordingly, at the time of performing the synchronization process, the FT control unit 21 of the hypervisor 20 can reliably acquire a change difference in the memory to be transferred from the primary side to the secondary side.

[3-2-3] Operation of DMA Read Request Monitoring Unit

Next, the process (operation) of the DMA read request monitoring unit 12 of the FT server 1' illustrated in FIG. 9 will be described along a flowchart (Steps S211 to S219) illustrated in FIG. 14 with reference to FIGS. 15A to 15C. The process (operation) of the DMA read request monitoring unit 12A is performed in the sequence of the items (4-1) to (4-3) described above.

FIG. 15A is a diagram that illustrates an example of the format of a PCIe transaction request header, and FIG. 15B is a diagram that illustrates an example of the format of a PCIe transaction completion header. In addition, FIG. 15C is a diagram that illustrates a monitoring target PCIe device management table 16b of the DMA interrupt control unit 16 of the FT server 1' illustrated in FIG. 9.

The DMA read request monitoring unit 12 waits for a PCIe transaction packet transmitted from the PCIe device 10e in Step S211. In a case where any PCIe transaction packet is not received (No route of Step S212), the process is returned to Step S211. On the other hand, in a case where a PCIe transaction packet is received (Yes route of Step S212), the DMA read request monitoring unit 12 determines whether or not the received packet is a memory read request transaction packet (DMA read request) transmitted from the monitoring target PCIe device 10e in Step S213.

At this time, the DMA read request monitoring unit 12 acquires the monitoring target PCIe device by referring to the monitoring target PCIe device management table 16b (see FIGS. 9 and 15C) of the DMA interrupt control unit 16, which is generated by the FT control unit 21, and performs the determination process of Step S213. In addition, the DMA read request monitoring unit 12 can determine whether or not the packet corresponds to the monitoring target PCIe device by referring to a requester ID included in the header of the PCIe transaction packet as illustrated in FIGS. 15A and 15B.

When the hypervisor 20 allocates a PCIe device to the VM 40 using the DMA remapping function 11b, the FT control unit 21, as illustrated in FIG. 15C, in the monitoring target PCIe device management table 16b, sets a requester ID corresponding to the PCIe device in association with an identifier VMID of the VM 40 using the PCIe device. The DMA interrupt control unit 16 can determine a VM 40 for which an interrupt needs to be generated by referring to this table 16b (see Steps S124 and S126 illustrated in FIG. 7 and Steps S234 and S236 illustrated in FIG. 17).

In a case where the received packet is not a memory read request transaction packet (No route of Step S213), the DMA read request monitoring unit 12 outputs the received packet to the DMA control unit 11 in Step S219, and the process ends.

On the other hand, in a case where the received packet is a memory read request transaction packet (Yes route of Step S213), the DMA read request monitoring unit 12 determines whether or not the interrupt factor flag 16a according to the detection of the memory read request transaction packet is set in the DMA interrupt control unit 16 in Step S214. In a case where the interrupt factor flag 16a is set (Yes route of Step S214), the DMA read request monitoring unit 12 regards the FT control unit 21 to be in the middle of the synchronization process and transfers the received packet to the DMA read request buffering unit 13 so as to be maintained therein in Step S215, and the process ends. Accordingly, the output of data from the PCIe device 10e to the outside is suppressed.

On the other hand, in a case where the interrupt factor flag 16a is not set (No route of Step S214), the DMA read request monitoring unit 12 regards the FT control unit 21 not to be in the middle of execution of the synchronization process. Then, in order to check whether it is necessary to perform the synchronization process, the DMA read request monitoring unit 12 refers to the dirty counter 17a and compares the current value of the dirty counter 17a with the value (the value stored in the storage area 17b) of the dirty counter 17a at the time of the previous reference in Step S216.

In a case where the current value of the dirty counter 17a and the value stored in the storage area 17b do not coincide with each other (No route of Step S217), the DMA read request monitoring unit 12 regards a memory difference for which the synchronization process performed by the FT control unit 21 is necessary to be present on the VM memory 10b. Then, the DMA read request monitoring unit 12 notifies the DMA interrupt control unit 16 of a device (a PCIe device 10e) from which the memory read request transaction packet has been detected and sets the interrupt factor flag 16a in Step S218. Accordingly, an interrupt is generated from the DMA interrupt control unit 16 for the hypervisor 20, and the FT control unit 21 performs a synchronization process. In addition, after the completion of the comparison between the current value of the dirty counter 17a with the value stored in the storage area 17b, the DMA read request monitoring unit 12 instructs the memory access monitoring unit 17 to replace the value stored in the storage area 17b with the current value of the dirty counter 17a.

Thereafter, the DMA read request monitoring unit 12 transfers the received packet, in other words, the memory read request transaction packet to the DMA read request buffering unit 13 so as to be stored therein in Step S215, and the process ends. Accordingly, the output of data from the PCIe device 10e to the outside is suppressed.

In a case where the current value of the dirty counter 17a and the value stored in the storage area 17b coincide with each other (Yes route of Step S217), the DMA read request monitoring unit 12 regards the primary side and the secondary side to be synchronized with each other. Then, the DMA read request monitoring unit 12 transfers a memory read request transaction packet to the DMA control unit 11 without storing the packet in the DMA read request buffering unit 13 in Step S219, and the process ends. Accordingly, the output of data from the physical device 10c to the outside is performed.

[3-2-4] Operation of DMA Read Data Monitoring Unit

Next, the process (operation) of the DMA read data monitoring unit 14 of the FT server 1' illustrated in FIG. 9 will be described along a flowchart (Steps S221 to S229) illustrated in FIG. 16. The process (operation) of the DMA read data monitoring unit 14 described here is performed in the sequence of the item (7) described above.

The DMA read data monitoring unit 14 waits for a PCIe transaction packet transmitted from the DMA control unit 11 in Step S221. In a case where any packet is not received (No route of Step S222), the process is returned to Step S221. On the other hand, in a case where a packet is received (Yes route of Step S222), the DMA read data monitoring unit 14 determines whether or not the received packet is a completion with data transaction packet (DMA read data) in Step S223.

At this time, the DMA read data monitoring unit 14 acquires the monitoring target PCIe device by referring to the monitoring target PCIe device management table 16b (see FIGS. 9 and 15C) of the DMA interrupt control unit 16, which is generated by the FT control unit 21, and performs the determination process of Step S223. In addition, the DMA read data monitoring unit 14 can determine whether or not the packet corresponds to the monitoring target PCIe device by referring to a requester ID included in the header of the PCIe transaction packet as illustrated in FIGS. 15A and 15B.

In a case where the received packet is not a completion with data transaction packet (No route of Step S223), the DMA read data monitoring unit 14 outputs the received packet to the PCIe device 10e in Step S229, and the process ends.

On the other hand, in a case where the received packet is a completion with data transaction packet (Yes route of Step S223), the DMA read data monitoring unit 14 determines whether or not the interrupt factor flag 16a according to the detection of the completion with data transaction packet is set in the DMA interrupt control unit 16 in Step S224. In a case where the interrupt factor flag 16a is set (Yes route of Step S224), the DMA read data monitoring unit 14 regards the FT control unit 21 to be in the middle of the synchronization process and transfers the received packet to the DMA read data buffering unit 15 so as to be stored therein in Step S225, and the process ends. Accordingly, the output of data from the PCIe device 10e to the outside is suppressed.

On the other hand, in a case where the interrupt factor flag 16a is not set (No route of Step S224), the DMA read data monitoring unit 14 regards the FT control unit 21 not to be in the middle of execution of the synchronization process. Then, in order to check whether or not the synchronization process needs to be performed, the DMA read data monitoring unit 14 refers to the dirty counter 17a and compares the current value of the dirty counter 17a with the value (the value stored in the storage area 17b) of the dirty counter 17a at the time of the previous reference in Step S226.

In a case where the current value of the dirty counter 17a and the value stored in the storage area 17b do not coincide with each other (No route of Step S227), the DMA read data monitoring unit 14 regards a memory difference for which the synchronization process performed by the FT control unit 21 is necessary to be present on the VM memory 10b. Then, the DMA read data monitoring unit 14 notifies the DMA interrupt control unit 16 of a device (a PCIe device 10e) from which the completion with data transaction packet has been detected and sets the interrupt factor flag 16a in Step S228. Accordingly, an interrupt is generated from the DMA interrupt control unit 16 for the hypervisor 20, and the FT control unit 21 performs a synchronization process. In addition, after the completion of the comparison between the current value of the dirty counter 17a with the value stored in the storage area 17b, the DMA read data monitoring unit 14 instructs the memory access monitoring unit 17 to replace the value stored in the storage area 17b with the current value of the dirty counter 17a.

Thereafter, the DMA read data monitoring unit 14 transfers the received DMA packet, in other words, the completion with data transaction packet to the DMA read data buffering unit 15 so as to be stored therein in Step S225, and the process ends. Accordingly, the output of data from the PCIe device 10e to the outside is suppressed.

In a case where the current value of the dirty counter 17a and the value stored in the storage area 17b coincide with each other (Yes route of Step S227), the DMA read data monitoring unit 14 regards the primary side and the secondary side to be synchronized with each other. Then, the DMA read data monitoring unit 14 transfers the completion with data transaction packet to the PCIe device 10e without storing the packet in the DMA read data buffering unit 15 in Step S229, and the process ends. Accordingly, the output of data from the PCIe device 10e to the outside is performed.

[3-2-5] Operation of DMA Interrupt Control Unit

Figure 17:
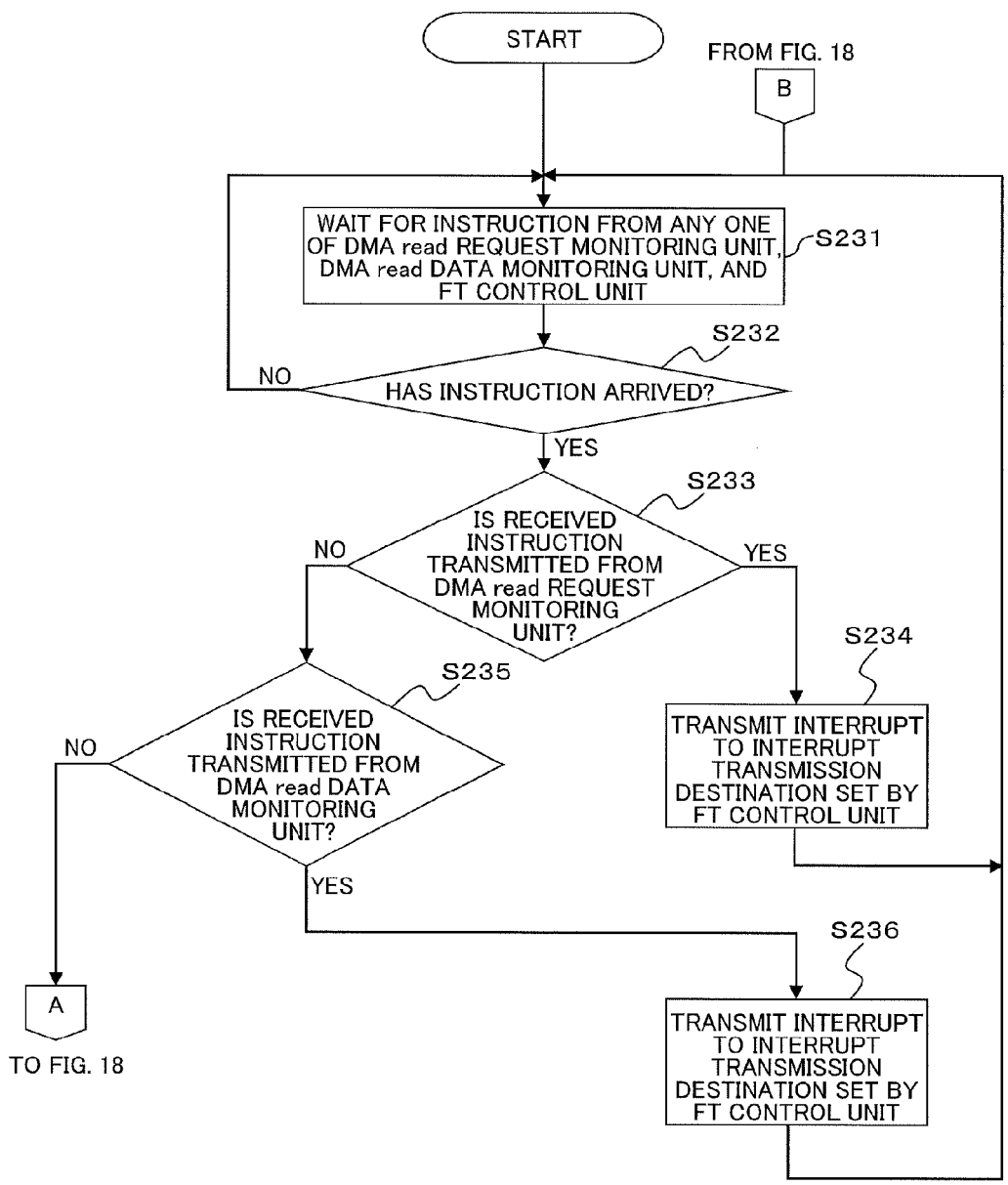
FIGS. 17 and 18 are flowcharts that illustrate the process of the DMA interrupt control unit of the FT server illustrated in FIG. 9.
Figure 18:
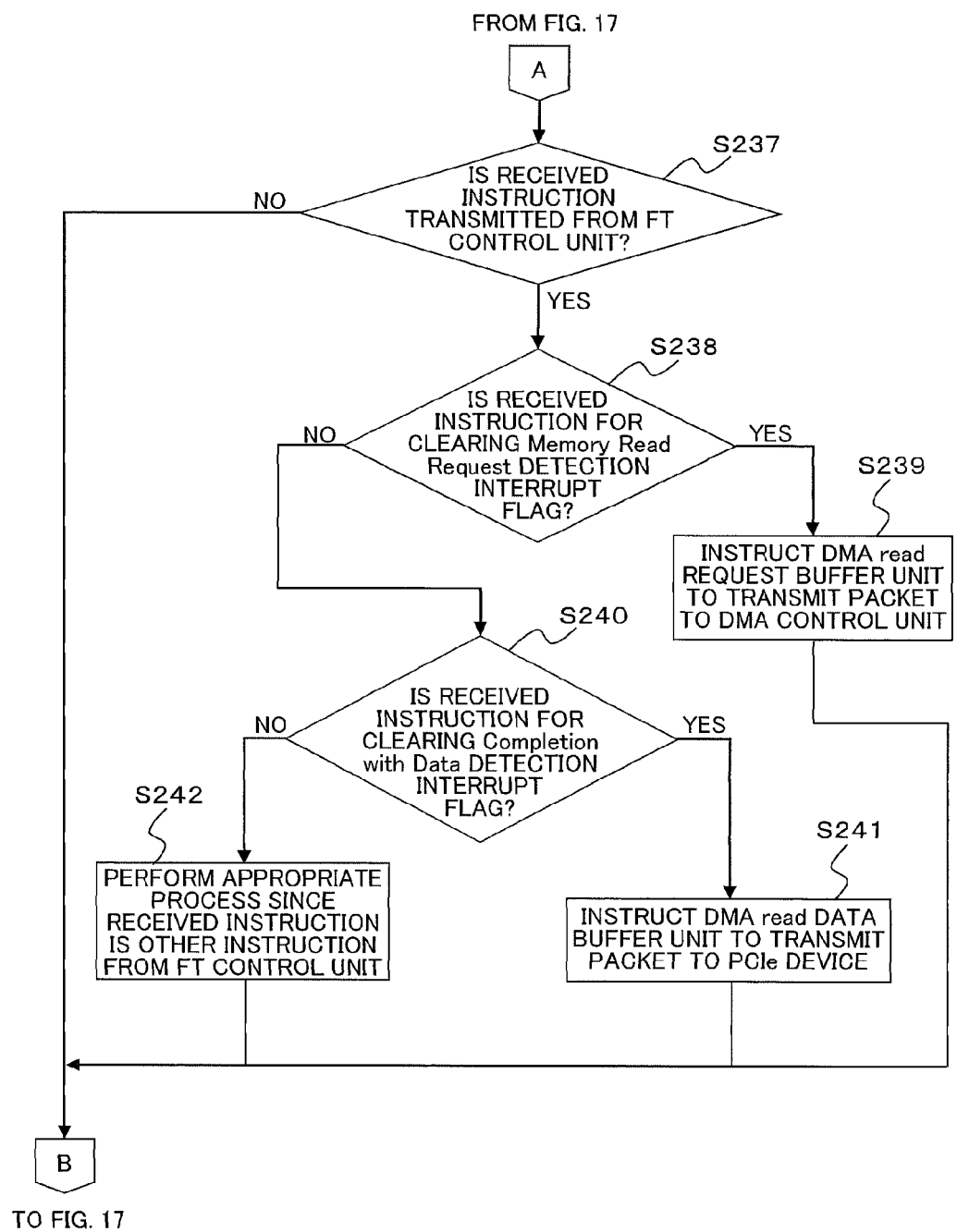

Next, the process (operation) of the DMA interrupt control unit 16 of the FT server 1' illustrated in FIG. 9 will be described along flowcharts (Steps S231 to S242) illustrated in FIGS. 17 and 18. The process (operation) of the DMA interrupt control unit 16 described here is performed in the sequence of the above-described items (4-4), (4-5), and (7).

The DMA interrupt control unit 16 waits for an instruction transmitted from any one of the DMA read request monitoring unit 12, the DMA read data monitoring unit 14, and the FT control unit 21 in Step S231. In a case where an instruction is not received (No route of Step S232), the process is returned to Step S231. On the other hand, in a case where an instruction has been received (Yes route of Step S232), the DMA interrupt control unit 16 determines whether or not the received instruction is an instruction transmitted from the DMA read request monitoring unit 12 in Step S233.

In a case where the received instruction is an instruction transmitted from the DMA read request monitoring unit 12 (Yes route of Step S233), the DMA interrupt control unit 16 transmits a memory read request transaction packet detection interrupt to an interrupt transmission destination set in advance by the FT control unit 21 in Step S234, and the process is returned to Step S231. At this time, the DMA interrupt control unit 16 determines the interrupt transmission destination by referring to the monitoring target PCIe device management table 16b and a requester ID included in the header of the memory read request transaction packet.

In a case where the received instruction is not an instruction transmitted from the DMA read request monitoring unit 12 (No route of Step S233), the DMA interrupt control unit 16 determines whether or not the received instruction is an instruction transmitted from the DMA read data monitoring unit 14 in Step S235.

In a case where the received instruction is an instruction transmitted from the DMA read data monitoring unit 14 (Yes route of Step S235), the DMA interrupt control unit 16 transmits a DMA read data detection interrupt to an interrupt transmission destination set in advance by the FT control unit 21 in Step S236, and the process is returned to Step S231. Also at this time, the DMA interrupt control unit 16 determines the interrupt transmission destination by referring to the monitoring target PCIe device management table 16b and a requester ID included in the header of the completion with data transaction packet.

On the other hand, in a case where the received instruction is not an instruction transmitted from the DMA read data monitoring unit 14 (No route of Step S235), the DMA interrupt control unit 16 determines whether or not the received instruction is an instruction transmitted from the FT control unit 21 in Step S237.

In a case where the received instruction is not an instruction transmitted from the FT control unit 21 (No route of Step S237), the DMA interrupt control unit 16 returns the process to Step S231. On the other hand, in a case where the received instruction is an instruction from the FT control unit 21 (Yes route of Step S237), the DMA interrupt control unit 16 determines whether or not the received instruction is an instruction for clearing the memory read request detection interrupt flag 16a in Step S238.

In a case where the received instruction is the instruction for clearing the memory read request detection interrupt flag 16a (Yes route of Step S238), the DMA interrupt control unit 16 instructs the DMA read request buffering unit 13 to transmit a memory read request transaction packet to the DMA control unit 11 in Step S239. Thereafter, the DMA interrupt control unit 16 returns the process to Step S231.

On the other hand, in a case where the received instruction is not the instruction for clearing the memory read request detection interrupt flag 16*a* (No route of Step S238), the DMA interrupt control unit 16 determines whether or not the received instruction is an instruction for clearing the completion with data detection interrupt flag 16*a* in Step S240.

In a case where the received instruction is the instruction for clearing the completion with data detection interrupt flag 16*a* (Yes route of Step S240), the DMA interrupt control unit 16 instructs the DMA read data buffering unit 15 to transmit a completion with data transaction packet to the PCIe device 10*e* in Step S241. Thereafter, the DMA interrupt control unit 16 returns the process to Step S231.

On the other hand, in a case where the received instruction is not the instruction for clearing the completion with data detection interrupt flag 16*a* (No route of Step S240), the received instruction is another instruction transmitted from the FT control unit 21, and accordingly, the DMA interrupt control unit 16 performs a process that is appropriate to the instruction in Step S242, and the process is returned to Step S231.

[3-2-6] Operation of DMA Write Monitoring Unit

Figure 19:
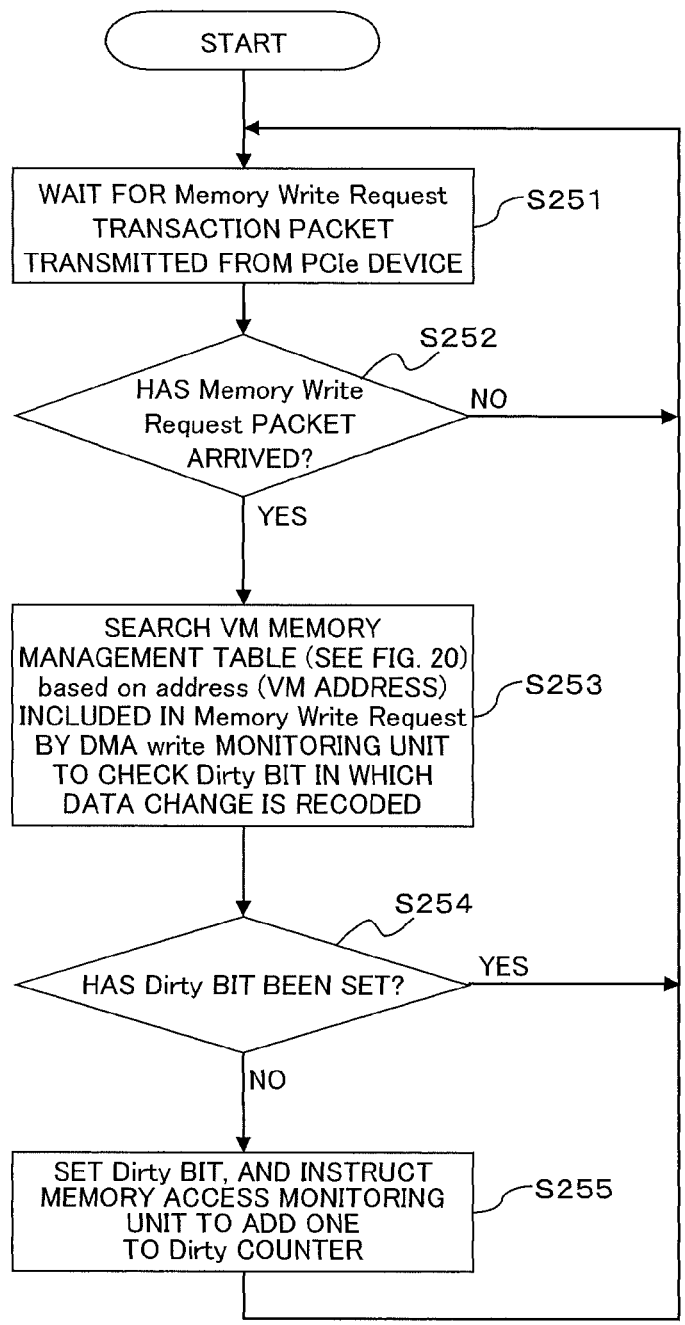
FIG. 19 is a flowchart that illustrates the process of a DMA write monitoring unit of the FT server illustrated in FIG. 9.
Figure 20:
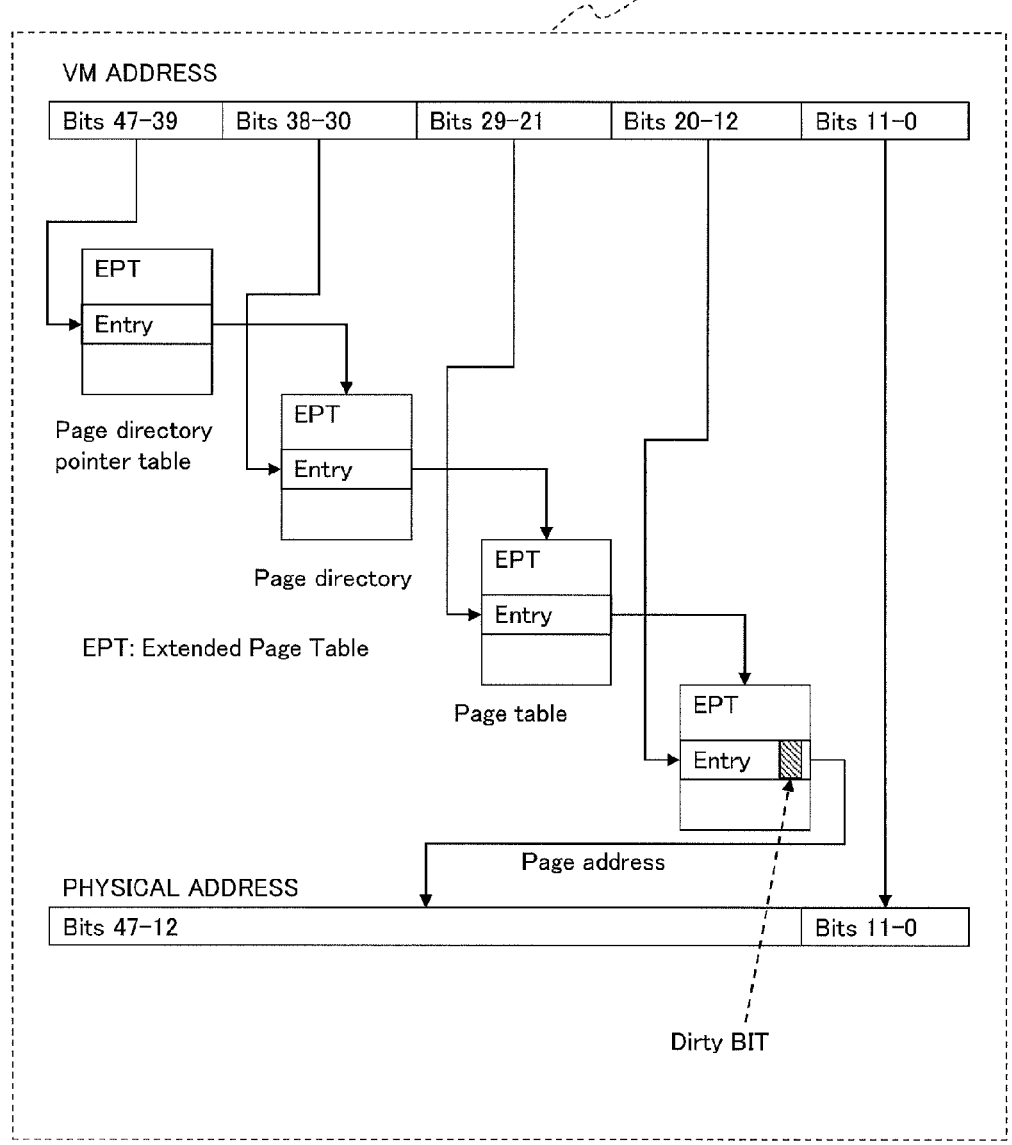
FIG. 20 is a diagram that illustrates an example of the VM memory management table in the FT server illustrated in FIG. 9.

Next, the process (operation) of the DMA write monitoring unit 11*a* of the FT server 1' illustrated in FIG. 9 will be described along a flowchart (Steps S251 to S255) illustrated in FIG. 19 with reference to FIG. 20. The process (operation) of the DMA write monitoring unit 11*a* described here is performed in the sequence of Sequences (11) to (14) described above. FIG. 20 is a diagram that illustrates an example of the VM memory management table 22 in the FT server 1' illustrated in FIG. 9.

The DMA write monitoring unit 11*a* waits for a memory write request transaction packet (MWr) transmitted from the PCIe device 10*e* in Step S251. In a case where any packet (MWr) is not received (No route of Step S252), the process is returned to Step S251. On the other hand, in a case where a memory write request transaction packet (MWr) is received (Yes route of Step S252), the DMA write monitoring unit 11*a* searches the VM memory management table 22 as illustrated in FIG. 20 by using an address (VM address) included in the received packet (MWr) as the key. In this way, the DMA write monitoring unit 11*a* checks whether or not "1" is set in the dirty bit (change bit) representing the occurrence of a change in the data at the VM address included in the packet (MWr) in Step S253.

In a case where "1" is set in the dirty bit (Yes route of Step S254), in other words, in a case where data of a recording target according to the received packet has already been changed, the DMA write monitoring unit 11*a* returns the process to Step S251.

On the other hand, in a case where "1" is set in the dirty bit, in other words, in a case where the dirty bit is "0" (No route of Step S254), the DMA write monitoring unit 11*a* sets "1" to a dirty bit corresponding to the VM address included in the packet (MWr) in the VM memory management table 22. Then, the DMA write monitoring unit 11*a* instructs the memory access monitoring unit 17 to increment the dirty counter 17*a* by one in Step S255, and the process is returned to Step S251.

In the VM memory management table 22, the dirty bit, generally, is set in a case where data on the memory 10*b* is rewritten by a program on the CPU (CPU core 10*a*). In addition to this, the dirty bit according to this embodiment is set also in a case where the data on the memory 10*b* is rewritten by an access (a DMA write request or a memory write request) from the network side (the physical device 10*c* side or the PCIe device 10*e* side).

[3-3] Advantage of FT Server According to Second Embodiment

In this way, according to the FT server 1' of the second embodiment including the PCIe device 10*e* as a physical device, by allowing the PCIe root complex 10*d* to serve as the DMA control unit 11, the DMA read request monitoring unit 12, the DMA read request buffering unit 13, the DMA read data monitoring unit 14, the DMA read data buffering unit 15, and the DMA interrupt control unit 16, the operations and advantages (g1) to (g6) that are the same as those of the first embodiment can be acquired.

[4] Others

While the preferred embodiment of the present invention has been described in detail, the present invention is not limited to the embodiment described above, but various changes and modifications can be made therein in a range not departing from the concept of the present invention.

All or some of the functions of the FT servers 1 and 1' of these embodiments including the functions of the DMA control unit 11, the DMA write monitoring unit 11*a*, the DMA remapping function 11*b*, the DMA read request monitoring unit 12, the DMA read request buffering unit 13, the DMA read data monitoring unit 14, the DMA read data buffering unit 15, the DMA interrupt control unit 16, the memory access monitoring unit 17, the hypervisor 20, the FT control unit 21, the management VM 30, and the VM 40 are realized by executing a predetermined program using a computer (including a CPU and various terminals).

The program is provided in a form being recorded in a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, a DVD+RW, or the like), or a Blue-ray disc. In such a case, the computer reads the program from the recording medium and transfers the program to an internal storage device or an external storage device so as to be stored therein and used.

According to an embodiment, the input/output access performance of virtual machine can be improved.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising a processor that builds:
   a virtual machine including a driver that performs data input/output using an input/output device; and
   a hypervisor that manages the virtual machine and performs a synchronization process between the information processing apparatus and another information processing apparatus which form a pair,
   wherein the processor
   monitors an access made between a memory and the input/output device;

notifies the hypervisor of detection of a reading access in a case where the reading access relating to data output from the memory to the input/output device is detected by the monitoring; and suppresses the data output from the memory to the input/output device, in a case where the hypervisor is during execution of the synchronization process when the hypervisor receives the notification, to prevent a synchronization state between the information processing apparatus and another information processing apparatus from being interrupted, wherein the information processing apparatus includes an interrupt factor flag configured to be set in a case where the processor generates an interrupt having detection of the reading access as a factor so as to cause the hypervisor to perform the synchronization process and to be cleared when the hypervisor ends the synchronization process, wherein the processor determines that the hypervisor is during execution of the synchronization process in a case where the interrupt factor flag is set and determines that the hypervisor is not during execution of the synchronization process in a case where the interrupt factor flap is not set.

2. The information processing apparatus according to claim 1, wherein the processor releases the suppression of the data output when the hypervisor ends the synchronization process.

3. The information processing apparatus according to claim 1, wherein the reading access is issuance of a reading request from the input/output device to the memory or reading of target data of the data output from the memory to the input/output device.

4. The information processing apparatus according to claim 3, wherein the processor suppresses the data output by temporarily maintaining the reading request or the target data in a buffer and, when the hypervisor ends the synchronization process, transmits the reading request from the buffer to a side of the memory or transmits the target data from the buffer to the input/output device.

5. The information processing apparatus according to claim 1, wherein the processor, in a case where a writing access relating to data writing from the input/output device to the memory is detected, records an occurrence of a change in data corresponding to an address relating to the data writing in a table for managing the memory, and wherein the hypervisor performs the synchronization process in accordance with the table.

6. The information processing apparatus according to claim 5, wherein the processor records the occurrence of the change by setting a change bit in the table, and wherein the hypervisor clears the change bit when the synchronization process ends.

7. The information processing apparatus according to claim 1, further the processor counts a number of portions of the memory in which a change in data occurs by a counter;

stores a count value acquired by the counter that is referred to at the time of the synchronization process of a previous time in a storage area;

compares in a case where the hypervisor is not during execution of the synchronization process when the hypervisor receives the notification, the value of the counter with the count value stored in the storage area and, suppresses, in a case where the value of the counter and the count value stored in the storage area do not coincide with each other, the data output to cause the hypervisor to perform the synchronization process.

8. The information processing apparatus according to claim 7, wherein the processor, in a case where the value of the counter and the count value stored in the storage area coincide with each other, performs the data output without suppressing the data output.

9. A method comprising:

in an information processing apparatus that includes a processor that builds a virtual machine including a driver that performs data input/output using an input/output device and a hypervisor that manages the virtual machine and performs a synchronization process between the information processing apparatus and another information processing apparatus which form a pair, monitoring an access made between a memory and the input/output device;

notifying the hypervisor of detection of a reading access in a case where the reading access relating to data output from the memory to the input/output device is detected in the monitoring of an access; and suppressing the data output from the memory to the input/output device, in a case where the hypervisor is during execution of the synchronization process when the hypervisor receives the notification, to prevent a synchronization state between the information processing apparatus and another information processing apparatus from being interrupted, wherein the information processing apparatus includes an interrupt factor flag configured to be set in a case where an interrupt having detection of the reading access as a factor is generated so as to cause the hypervisor to perform the synchronization process and to be cleared when the hypervisor ends the synchronization process, wherein the hypervisor is determined to be during execution of the synchronization process in a case where the interrupt factor flag is set, and the hypervisor is determined not to be during execution of the synchronization process in a case where the interrupt factor flag is not set.

10. The method of controlling an information processing apparatus according to claim 9, wherein the suppression of the data output is released when the hypervisor ends the synchronization process.

11. The method of controlling an information processing apparatus according to claim 9, wherein the reading access is issuance of a reading request from the input/output device to the memory or reading of target data of the data output from the memory to the input/output device.

12. The method of controlling an information processing apparatus according to claim 11, wherein the data output is suppressed by temporarily maintaining the reading request or the target data in a buffer, and wherein, when the hypervisor ends the synchronization process, the reading request is transmitted from the buffer to a side of the memory, or the target data is transmitted from the buffer to the input/output device.

13. The method of controlling an information processing apparatus according to claim 9, wherein, in a case where a writing access relating to data writing from the input/output device to the memory is detected in the monitoring of an access, an occurrence of a change in data corresponding to an address relating to the data writing is recorded in a table for managing the memory, and wherein the hypervisor performs the synchronization process in accordance with the table.

14. The method of controlling an information processing apparatus according to claim 13, wherein the occurrence of a change is recorded by setting the change bit in the table, and wherein the hypervisor clears the change bit when the synchronization process ends.

15. The method of controlling an information processing apparatus according to claim 9, the method further comprising:

counting a number of portions of the memory in which a change in data occurs by a counter; and storing a count value acquired by the counter that is referred to at the time of the synchronization process of a previous time in a storage area, wherein, in a case where the hypervisor is not during execution of the synchronization process when the hypervisor receives the notification, the value of the counter is compared with the count value stored in the storage area, and, in a case where the value of the counter and the count value stored in the storage area do not coincide with each other, the suppression of the data output is performed, and the hypervisor is caused to perform the synchronization process.

16. The method of controlling an information processing apparatus according to claim 15, wherein, in a case where the value of the counter and the count value stored in the storage area coincide with each other, the data output is performed without suppressing the data output.

* * * * *